US012555727B2

(12) United States Patent
Cha

(10) Patent No.: US 12,555,727 B2
(45) Date of Patent: Feb. 17, 2026

(54) ARC CHUTE AND LOAD SWITCH COMPRISING SAME

(71) Applicant: LS ELECTRIC CO., LTD., Anyang-si (KR)

(72) Inventor: Sangwook Cha, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 236 days.

(21) Appl. No.: 18/278,773

(22) PCT Filed: Jan. 17, 2022

(86) PCT No.: PCT/KR2022/000843

§ 371 (c)(1),
(2) Date: Aug. 24, 2023

(87) PCT Pub. No.: WO2022/181986

PCT Pub. Date: Sep. 1, 2022

(65) Prior Publication Data

US 2024/0136130 A1 Apr. 25, 2024
US 2024/0234056 A9 Jul. 11, 2024

(30) Foreign Application Priority Data

Feb. 26, 2021 (KR) ........................ 10-2021-0026772

(51) Int. Cl.
*H01H 9/34* (2006.01)
*H01H 33/08* (2006.01)
(Continued)

(52) U.S. Cl.
CPC ............ *H01H 33/121* (2013.01); *H01H 9/34* (2013.01); *H01H 33/08* (2013.01); *H01H 33/42* (2013.01)

(58) Field of Classification Search
CPC ...... H01H 1/2041; H01H 1/365; H01H 9/362; H01H 9/34; H01H 9/30; H01H 9/46;
(Continued)

(56) References Cited

U.S. PATENT DOCUMENTS 2,393,164 A * 1/1946 Hobson .................... H01H 9/34 218/34
2,652,469 A * 9/1953 Weston .................... H01H 9/34 218/149
(Continued)

FOREIGN PATENT DOCUMENTS

CN 207731889 U 8/2018
CN 208077849 U 11/2018
(Continued)

OTHER PUBLICATIONS

International Search Report for related International Application No. PCT/KR2022/000843; action dated Sep. 1, 2022; (3 pages).
(Continued)

*Primary Examiner* — William A Bolton
(74) *Attorney, Agent, or Firm* — K&L Gates LLP

(57) ABSTRACT

The present invention provides an arc chute, which can be provided to make close contact with a curved frame part, and a load switch comprising same, the arc chute comprising: two cover parts, which are arranged to be adjacent to the outer circumference of a frame part, are spaced apart from each other, and overlap each other in the axial direction of the frame part; and an arc grid which is arranged between the two cover parts so as to be coupled to each of the two cover parts, wherein the cover part is formed in a shape in which one side coming into contact with the outer circumference of the frame part corresponds to the outer circumference of the frame part.

19 Claims, 29 Drawing Sheets

(51) Int. Cl.
*H01H 33/12* (2006.01)
*H01H 33/42* (2006.01)

(58) Field of Classification Search
CPC ........... H01H 2009/365; H01H 33/121; H01H 33/08; H01H 33/42; H01H 33/22; H01H 33/022; H01H 33/18; H01H 33/53; H01H 33/10; H01H 3/38; H01H 3/54; H01H 73/045; H01H 73/18
USPC ......... 218/81, 15, 34, 38, 46, 103, 105, 149; 200/10, 50.34, 544
See application file for complete search history.

(56) References Cited

U.S. PATENT DOCUMENTS

| | | | | |
|---|---|---|---|---|
| 4,395,606 | A * | 7/1983 | Zaffrann | H01H 9/345 200/293 |
| 7,488,915 | B2 * | 2/2009 | Pollitt | H01H 9/342 335/201 |
| 7,863,537 | B2 * | 1/2011 | Shea | H01H 9/46 218/147 |
| 8,847,096 | B2 * | 9/2014 | Juds | H01H 9/443 218/34 |
| 8,947,181 | B2 * | 2/2015 | Malingowski | H01H 73/18 218/32 |
| 9,396,890 | B2 * | 7/2016 | Smeltzer | H01H 9/36 |
| 9,431,197 | B2 * | 8/2016 | Engewald | H01H 33/182 |
| 9,472,362 | B2 * | 10/2016 | Uitto | H01H 1/42 |
| 10,163,598 | B2 * | 12/2018 | Lee | H01H 9/36 |
| 10,224,163 | B2 * | 3/2019 | Freitas | H01H 33/08 |
| 10,896,789 | B2 * | 1/2021 | Strand | H01H 1/42 |
| 2021/0020397 | A1 * | 1/2021 | Oh | H01H 73/18 |

FOREIGN PATENT DOCUMENTS

| | | | |
|---|---|---|---|
| CN | 109950071 | A | 6/2019 |
| JP | 2016042414 | A | 3/2016 |
| JP | 2018160359 | A | 10/2018 |
| JP | 6516078 | B1 | 5/2019 |
| KR | 100549510 | B1 | 2/2006 |
| KR | 101315008 | B1 | 10/2013 |
| KR | 20140136825 | A | 12/2014 |

OTHER PUBLICATIONS

Written Opinion for related International Application No. PCT/KR2022/000843; action dated Sep. 1, 2022; (4 pages).
Office Action for related Korean Application No. 10-2021-0026772; action dated Aug. 31, 2023; (6 pages).
Office Action for related Korean Application No. 10-2021-0026772; action dated May 7, 2024; (6 pages).

* cited by examiner

ARC CHUTE AND LOAD SWITCH COMPRISING SAME

CROSS-REFERENCE TO RELATED APPLICATIONS

This application is the National Stage filing under 35 U.S.C. 371 of International Application No. PCT/KR2022/000843, filed on Jan. 17, 2022, which claims the benefit of earlier filing date and right of priority to Korea utility model Application No. 10-2021-0026772 filed on Feb. 26, 2021, the contents of which are all hereby incorporated by reference herein in their entirety.

FIELD

Technical Field

The present disclosure relates to an arc chute and a load break switch (load switch) including the same, and more particularly, to an arc chute that can be installed closely on a curved frame part and a load switch including the same.

Background

A load break switch (LBS) refers to a component that opens and closes a rated current of an electric line to branch and divide the line and protect a power system. Furthermore, when short-circuit protection is not required in a general power circuit, a load switch may be used to block overload current and ground fault current instead of a circuit breaker.

The load switch includes a fixed terminal part that is electrically connected to an external power source and a load, and a movable terminal part that is movable in a direction toward or away from the fixed terminal part.

The movable terminal part may be manually or automatically manipulated to move to be brought into contact with and separated from the fixed terminal part.

When the movable terminal part is brought into contact with the fixed terminal part, the load switch is electrically connected to the external power source and load. That is, when the movable terminal part is brought into contact with the fixed terminal part, a switching load device supplies power to the load.

On the other hand, when the movable terminal part is separated from the fixed terminal part, the load switch is disconnected from the external power source and load, and cuts off the supply of power to the load. During the process, an arc is generated between the movable terminal part and the fixed terminal part.

An arc is generated when a voltage is generated between two electrodes disposed with gas interposed therebetween, and refers to an electrical discharge resulting from that the gas interposed between the two electrodes is converted into an electrical connection medium.

An arc is a flow of high-temperature and high-voltage electrons, which may delay current interruption and cause damage to the load switch. Therefore, there is a need for prompt treatment of an arc generated during the process that the load switch cuts off power. This is called arc extinguishing. The load switch includes an arc chute for extinguishing an arc.

The arc chute refers to a component that extinguishes an arc generated in the process of opening/closing and breaking current. The arc chute extinguishes an arc by elongating a length of the arc and cooling the arc.

A typical arc chute is equipped with a plurality of arc grids. Each arc grid elongates a length of an arc by guiding the arc away from a fixed terminal part.

An arc chute may be installed in various forms depending on an installation environment and operating conditions of a load switch. Among others, in the present disclosure, the arc chute is installed outside a frame part of a rotary load switch.

When the arc chute is installed outside the frame part, an effect of arc induction and elongation may be maximized when the arc chute and the frame part are in close contact with each other. However, it is difficult for the related art arc chute to be installed in close contact with an outer circumferential surface of the frame part formed in a cylindrical shape.

This may adversely affect an arc induction and elongation process of the arc chute. In addition, this may bring about an unnecessary volume increase of the load switch.

Therefore, it may be taken into account of developing an arc chute that can be installed to be in closer contact with the load switch.

Korean Patent Registration No. 10-0549510 discloses a gas insulated load break switch. Specifically, a gas insulated load break switch in which an arc chute is disposed on a main circuit fixed electrode of the switch is disclosed.

However, this type of load break switch does not disclose an arc chute installed on a curved frame part. Furthermore, this type of load break switch does not disclose a structure of an arc chute that can be installed in close contact with the curved frame part.

Korean Patent Registration No. 10-1315008 discloses an arc chute. Specifically, an arc chute including a plurality of grids stacked in a spaced manner to form a multi-layered structure is disclosed.

However, even this type of load break switch does not disclose a structure of an arc chute that can be installed in close contact with a curved frame part. Therefore, an arc induction and elongation of the arc chute may be insufficiently achieved.

PRIOR ART DOCUMENT

Patent Document

[Patent Document 1) Korean Patent Registration No. 10-0549510 (Jan. 27, 2006)

[Patent Document 2) Korean Patent Registration No. 10-1315008 (Sep. 27, 2013)

SUMMARY

One aspect of the present disclosure is to provide an arc chute capable of being installed in close contact with a frame part of a rotary load (break) switch, and a load switch including the same.

Another aspect of the present disclosure is to provide an arc chute capable of suppressing an arc reignition phenomenon in an arc extinguishing process, and a load switch including the same.

Another aspect of the present disclosure is to provide an arc chute in which an arc grid can induce an arc more efficiently, and a load switch including the same.

Another aspect of the present disclosure is to provide an arc chute capable of further increasing an arc elongation and cooling effect when the arc is extinguished, and a load switch including the same.

Another aspect of the present disclosure is to provide an arc chute with maximized arc extinguishing capability, and a load switch including the same.

In order to achieve those aspects and in accordance with the purpose of the present disclosure, as embodied and broadly described herein, there is provided an arc chute that may include: a fixed terminal part; two cover parts disposed adjacent to the fixed terminal part, spaced apart from each other, and overlapping each other in one direction; and an arc grid disposed between the two facing cover parts, coupled to each of the two cover parts, and spaced apart from the fixed terminal part, wherein the arc grid is provided in plurality, and the plurality of arc grids are formed such that lengths thereof are gradually decreased in a direction away from the fixed terminal part.

The arc chute may further include an arc runner disposed between the two cover parts, coupled to each of the two cover parts, disposed between the fixed terminal part and the arc grid, and having one portion in contact with the fixed terminal part.

The arc runner may extend in a direction toward the fixed terminal part, one end portion thereof toward the fixed terminal part may be bent in a direction opposite to the fixed terminal part, and the one portion in contact with the fixed terminal part may be located at the one side based on a bending line of the one end portion.

The arc grid may include a grid base portion formed in a plate shape extending in a direction toward the cover parts, and two grid legs extending from one side of the grid base portion.

The arc chute may further include a frame part formed in a column shape and accommodating a portion of the fixed terminal part; and a movable contact accommodated inside the frame part to be rotatable centering on a central axis of the frame part. The grid legs may extend to a radial inside of the frame part, and may be formed such that a distance between one end thereof facing the radial inside of the frame part and the central axis of the frame part is shorter than a distance between the movable contact and the central axis of the frame part. A grid concave portion may be formed in a space between the two grid legs, and a width of the grid concave portion may be larger than a width of the movable contact.

The movable contact may rotate while passing through the grid concave portion when rotating in a direction away from or toward the fixed terminal part.

The arc chute may further include a movable contact holder formed in a bar shape extending in a radial direction of the frame part and having the movable contact on one end portion thereof; and a puffer guide formed in a column shape extending in the radial direction of the frame part, having a hollow formed therein to accommodate the movable contact holder, and having the movable contact disposed on an outside thereof.

A center line of the two grid legs may be spaced apart from a center line of the arc grid to be biased with respect to the arc grid.

The arc grid may be provided in plurality, the plurality of arc grids may be disposed in a predetermined direction, and the grid legs disposed on two of the arc grids adjacent to each other may be disposed so as not to overlap each other in the predetermined direction.

The arc grid may be provided with an arc hole formed therethrough in a thickness direction.

The arc hole of the arc grid may be provided in plurality.

In order to achieve those aspects and in accordance with the purpose of the present disclosure, as embodied and broadly described herein, there is provided a load switch that may include: an opening and closing part including a fixed terminal part and a movable terminal part; a frame part accommodating a portion of the fixed terminal part; a rotating shaft rotatably coupled to the frame part, and connected to the movable terminal part to rotate together with the movable terminal part; and an arc chute disposed adjacent to the fixed terminal part, wherein the arc chute may include two cover parts spaced apart from each other, overlapping each other in one direction, and each having at least one side formed in a curved shape; and an arc grid disposed between the two cover parts facing each other, coupled to each of the two cover parts, and spaced apart from the fixed terminal part. The arc grid may be provided in plurality, and the plurality of arc grids may be disposed such that lengths thereof are gradually decreased in a direction away from the fixed terminal part.

The arc chute may include an arc runner disposed between the two cover parts facing each other, coupled to each of the two cover parts, disposed between the fixed terminal part and the arc grid, and having one portion in contact with the fixed terminal part.

The arc runner may extend in a direction toward the fixed terminal part, and have one end portion, facing the fixed terminal part, bent in an opposite direction to the fixed terminal part, and the one portion in contact with the fixed terminal part may be located at a radial inside of the frame part based on a bending line of the one end portion.

The movable terminal part may include a movable contact accommodated inside the frame part to be rotatable centering on a central axis of the rotating shaft. The arc grid may include: a grid base portion formed in a plate shape extending in a direction toward the cover parts; and two grid legs extending from one side of the grid base portion to a radial inside of the frame part. The grid legs may be formed such that a distance between one end facing the radial inside of the frame part and the rotating shaft is shorter than a distance between the movable contact and the rotating shaft. A grid concave portion may be formed in a space between the two grid legs, and the grid concave portion may have a width larger than that of the movable contact, such that the movable contact rotates while passing therethrough.

The arc chute may further include a movable contact holder formed in a bar shape extending in a radial direction of the frame part and having the movable contact on one end portion thereof; and a puffer guide formed in a column shape extending in the radial direction of the frame part, having a hollow formed therein to accommodate the movable contact holder, and having the movable contact disposed on an outside thereof.

The frame part may be formed in a column shape, the cover part may be formed in a plate shape extending in circumferential and radial directions of the frame part, and one side thereof may be in contact with an outer circumferential surface of the frame part. The one side of the cover part may be formed in a shape corresponding to an outer circumference of the frame part, and another side thereof different from the one side may be located adjacent to the fixed terminal part.

The arc chute may include a plurality of arc grids disposed at a predetermined interval along a predetermined curve, and the predetermined curve may be formed in a shape corresponding to the outer circumference of the frame part.

The arc grid may include a grid base portion formed in a plate shape extending in a direction toward the cover parts; and two grid legs extending from one side of the grid base portion to a radial inside of the frame part. The grid legs disposed on two adjacent arc grids may be disposed so as not to overlap each other in a circumferential direction of the frame part.

The arc chute may be provided in plurality, and two of the plurality of arc chutes facing each other with the rotating shaft interposed therebetween may be disposed to be point-symmetrical with respect to the rotating shaft.

Among various effects of the present disclosure, effects that can be obtained through the above-described solution will be described as follows.

First, an arc chute is provided with cover parts and a plurality of arc grids. A radius of curvature of the cover part is identical to that of a frame part. The plurality of arc grids are disposed at regular intervals along a predetermined curve formed with the same radius of curvature as that of the frame part.

Therefore, the arc chute can be fastened in close contact with the frame part of a rotary load switch. This may make the arc chute more advantageous for inducing and elongating an arc. Furthermore, an arc extinguishing performance of the arc chute can be further improved.

Also, the plurality of arc grids are disposed so that lengths thereof are gradually decreased in a direction away from a fixed terminal part.

Therefore, under a condition that the number of arc grids provided in the arc chute is the same, an insulation distance between a movable contact and the arc grid can be further increased. Accordingly, an arc re-ignition phenomenon that may occur during an arc extinguishing process can be prevented. Furthermore, damage of the arc chute due to the re-ignition of the arc can be suppressed.

In addition, an arc runner is additionally installed between the arc grid and the fixed terminal part. At this time, a portion of the arc runner is in contact with the fixed terminal part to primarily induce an arc when the arc is generated. That is, the arc is induced toward the arc runner before being induced to the arc grid.

Therefore, the arc grid can induce the arc more efficiently. Accordingly, the arc chute can more efficiently perform an arc extinguishing operation.

Also, when a movable terminal part rotates, a movable contact can pass through a grid concave portion. In this case, the grid concave portion means a space formed between the grid legs of the arc grid.

Thus, a guide path of the arc can be moved more inward with respect to the grid concave portion. Accordingly, an elongation and cooling effect of the arc can be further increased. This can result in an increase in arc extinguishing efficiency of the arc chute.

In addition, the arc chute is provided in plurality. The plurality of arc chutes are disposed adjacent to different fixed terminal parts, respectively. Two arc chutes facing each other with the rotating shaft interposed therebetween are disposed to be point-symmetrical with respect to a central axis of the rotating shaft.

Accordingly, different arc chutes may be installed adjacently respectively to the two fixed terminal parts facing each other with the rotating shaft interposed therebetween. This can maximize arc extinguishing capability of the arc chutes.

DETAILED DESCRIPTION

Figure 1:
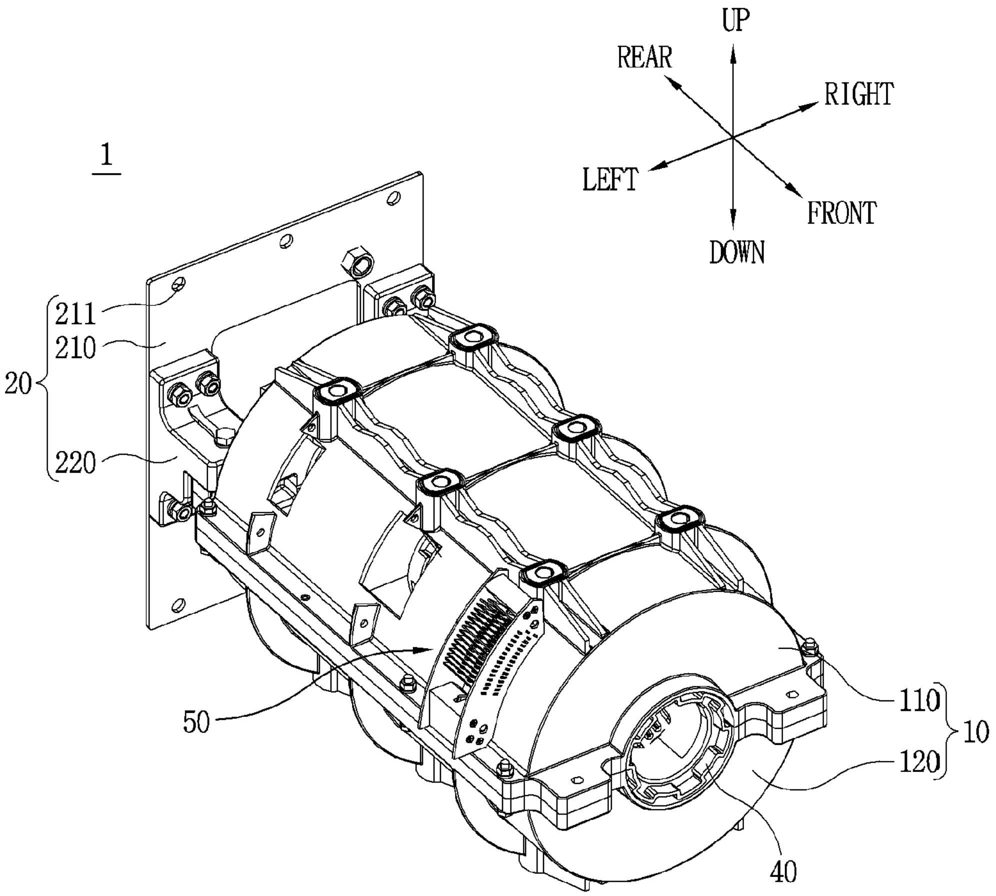
FIG. 1 is a perspective view illustrating a load switch in accordance with one embodiment of the present disclosure.

Hereinafter, a load switch (load break switch) 1 according to an embodiment of the present disclosure will be described in detail with reference to the drawings.

In the following description, descriptions of some components will be omitted to help understanding of the present disclosure.

In this specification, the same/like reference numerals are given to the same/like components even in different embodiments, and a redundant description thereof will be omitted.

The accompanying drawings are merely used to help easily understand the technical idea of the present disclosure and it should be understood that the idea of the present disclosure is not limited by the accompanying drawings.

A singular representation may include a plural representation unless it represents a definitely different meaning from the context.

The terms “top”, “bottom”, “left”, “right”, “front” and “rear” used in the following description will be understood based on a coordinate system illustrated in FIGS. 1, 8, 15, 20, and 25.

1. Description of Load Switch 1 According to Embodiment of the Present Disclosure Hereinafter, a load switch 1 according to an embodiment of the present disclosure will be described in detail, with reference to FIGS. 1 to 23. However, a direction that each component rotates may be understood with reference to FIGS. 4, 5, 7, and 29.

The load switch 1 may open and close a rated current of an electric circuit. That is, the load switch 1 may allow or block an electrical connection between external power source and load. To this end, the load switch 1 is electrically connected to the external power source and load. In other words, the external power source and load are electrically connected to each other by the load switch 1.

When a fixed contact 321*b*, 322*b* and a movable contact 332 of the load switch 1 come into contact with each other, the external power source and load may be electrically connected to each other through the load switch 1. On the other hand, when the fixed contact 321*b*, 322*b* and the movable contact 332 of the load switch 1 are spaced apart from each other, the external power source and load may be electrically disconnected from each other.

Whether to open or close the load switch 1 may be manually or automatically manipulated. To this end, a separate manipulation unit may be coupled to the load switch 1.

Hereinafter, the configuration of the load switch 1 according to the embodiment of the present disclosure will be described with reference to the accompanying drawings, and a frame part 10, a fixing part 20, an opening and closing part 30, a rotating shaft 40, an arc chute 50, and a puffer guide 60 will be described separately.

(1) Description of Configuration of Load Switch 1

The load switch 1 may be electrically connected to or disconnected from the external power source and load such that the external power source and load can be electrically connected to or disconnected from each other. Specifically, in the load switch 1, a fixed terminal part 320 and a movable terminal part 330 are brought into contact with or spaced apart from each other, to electrically connect or disconnect the external power source and load.

In one embodiment, the load switch 1 is coupled to a handle. The user may manipulate the handle to manually control whether to open or close the load switch 1. In the case of the load switch 1 provided in a ring main unit (RMU), whether to open or close the load switch 1 may be controlled by rotating the handle.

In another embodiment, a manipulation unit is attached to the load switch 1. The manipulation unit opens or closes an electric circuit between the external power source and load under specific conditions. That is, whether to open or close the load switch 1 may be automatically controlled by the manipulation unit.

In the illustrated embodiment, the load switch 1 includes a frame part 10, a fixing part 20, an opening and closing part 30, a rotating shaft 40, an arc chute 50, and a puffer guide 60.

Hereinafter, the configuration of the load switch 1 will be described in more detail with reference to the accompanying drawings.

(2) Description of Frame Part 10 and Fixing Part 20

Figure 2:
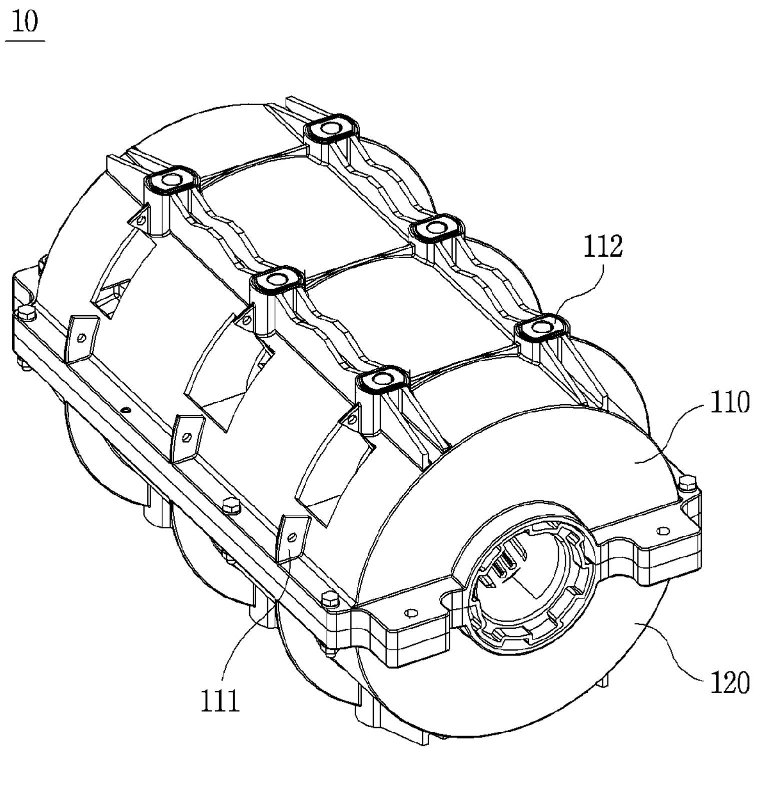
FIG. 2 is a perspective view illustrating a frame part disposed in the load switch of FIG. 1.
Figure 3:
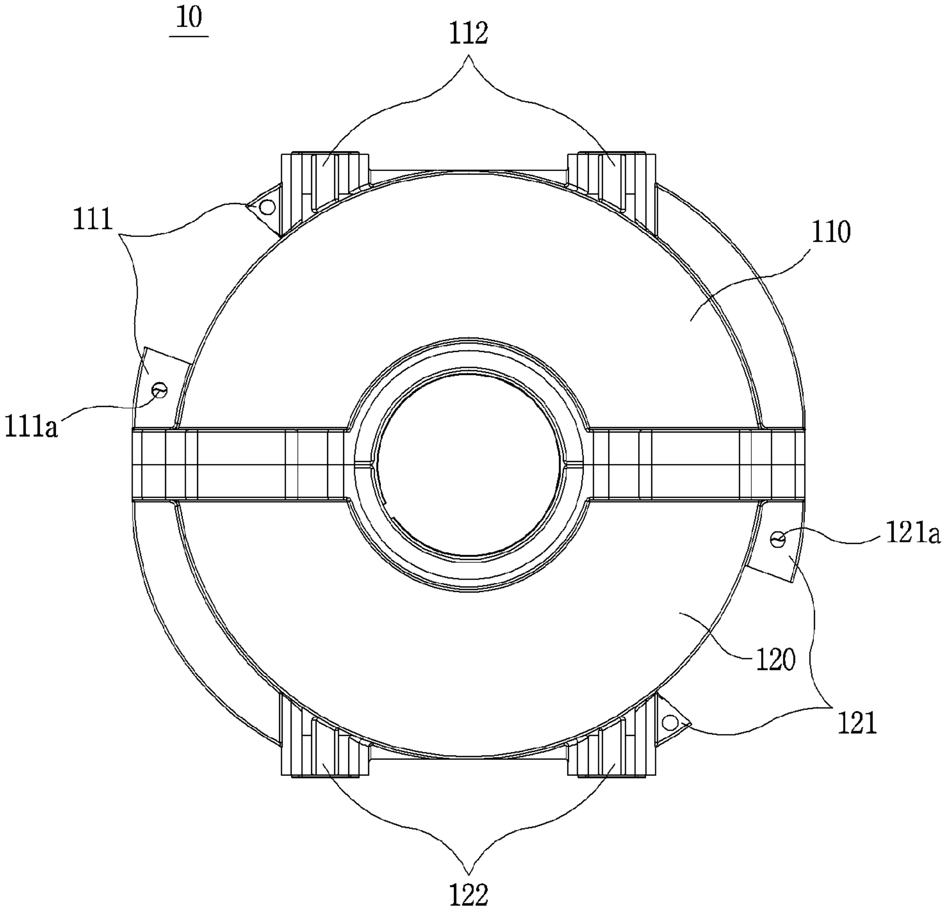
FIG. 3 is a front view of the frame part of FIG. 2.

Hereinafter, the frame part 10 will be described with reference to FIGS. 1 to 3.

The frame part 10 defines appearance of the load switch 1.

The frame part 10 is formed in a cylindrical shape.

An outer circumference of the frame part 10 is formed in a shape corresponding to a shape of the arc chute 50.

A through hole is formed through the outer circumference of the frame part 10 such that a fixed terminal part 320 is accommodated therein. In the illustrated embodiment, through holes defined in up and down directions are formed through upper and lower outer circumferential surfaces of the frame part 10 to accommodate the fixed terminal part 320.

A space for accommodating various devices is defined inside the frame part 10. Various devices that are disposed for the load switch 1 to perform functions for applying or cutting off current transmitted from outside may be accommodated in the space. In the illustrated embodiment, the opening and closing part 30, the rotating shaft 40, and the puffer guide 60 are accommodated in the space.

The rotating shaft 40 coupled to the puffer guide 60 is coupled through the frame part 10. In the illustrated embodiment, the rotating shaft 40 is coupled through a central portion of the frame part 10 in front and rear directions. Specifically, the rotating shaft 40 is located on a straight line with a central axis of the frame part 10.

Gas inside the frame part 10 may be momentarily compressed by pressure generated when the rotating shaft 40 rotates. The gas moves in an opposite direction through the puffer guide 60. During the process, the gas may pass through the puffer guide 60 at high speed. As a result, an arc generated during an opening and closing process may be extinguished through the process.

The fixing part 20 and the arc chute 50 are fixedly coupled to the outside of the frame part 10. In the illustrated embodiment, the fixing part 20 is coupled to a rear side of the frame part 10, and the arc chute 50 is coupled to an outer circumference of the frame part 10.

In one embodiment, the frame part 10 may be formed of an insulating material. For example, the frame part 10 may be formed of a synthetic resin material. This may suppress an arbitrary electrical connection between inside and outside of the frame part 10. That is, an arc, which is a flow of electrons, may be prevented from arbitrarily leaking out of the frame part 10.

In another embodiment, the frame part 10 may be formed of a material having high pressure resistance and high heat resistance. Accordingly, damage of the frame part 10 due to the arc, which is a flow of high-temperature and high-pressure electrons, can be suppressed.

In the illustrated embodiment, the frame part 10 includes an upper frame 110 and a lower frame 120.

The upper frame 110 defines upper appearance of the load switch 1.

The upper frame 110 is formed in a semi-cylindrical shape. Specifically, the upper frame 110 has a semi-cylindrical shape with a curved portion facing upward. At this time, an outer circumference of the upper frame 110 is formed in a shape corresponding to the shape of the arc chute 50.

The arc chute 50 is coupled in close contact with the outer circumferential surface of the upper frame 110. To this end, an upper fastening wing 111 may be formed on an outer circumference of the upper frame 110. That is, the upper fastening wing 111 is coupled to be in close contact with the arc chute 50.

The upper fastening wing 111 is disposed adjacent to the arc chute 50 and inserted into the arc chute 50.

The upper fastening wing 111 is formed in a plate shape. The upper fastening wing 111 extends from an arcuate portion defined by any two points on the outer circumferential surface of the upper frame to a radial outside of the upper frame 110. That is, the upper fastening wing 111 protrudes from the outer circumferential surface of the upper frame 110 to the radial outside of the frame part 10.

In one embodiment, the upper fastening wing 111 may be formed in a shape corresponding to a fastening groove 511 of the arc chute 50 to be described later.

An upper fastening wing hole 111*a* is formed in the upper fastening wing 111.

The upper fastening wing hole 111*a* serves as a passage of a coupling member 520 of the arc chute 50. The coupling member 520 of the arc chute 50 passes through the upper fastening wing hole 111*a* to be coupled to the upper fastening wing 111. That is, the coupling member 520 of the arc chute 50 is coupled through the upper fastening wing hole 111*a*. In one embodiment, the coupling may be made in a bolt coupling manner.

The upper fastening wing hole 111*a* may be formed by extending a predetermined cross-section in one direction. At this time, the predetermined cross-section may change depending on the coupling member 520 of the arc chute 50. In the illustrated embodiment, the upper fastening wing hole 111*a* is formed by extending a circular cross-section in the front and rear directions.

In addition, an upper fixed terminal accommodating portion 112 in which the fixed terminal part 320 is accommodated protrudes from an outer circumference of the upper frame 110.

The upper fixed terminal accommodating portion 112 accommodates the fixed terminal part 320 so that the fixed terminal part 320 communicates with outer and inner spaces of the frame part 10.

A space capable of accommodating the fixed terminal part 320 is defined inside the upper fixed terminal accommodating portion 112. Specifically, a fixed contact holder 321*a*, 322*a* is accommodated in the space. That is, the fixed contact holder 321*a*, 322*a* is coupled through the upper fixed terminal accommodating portion.

The upper fixed terminal accommodating portion 112 is formed in a column shape with a hollow inside. In the illustrated embodiment, the upper fixed terminal accommodating portion 112 extends upward from an upper outer circumferential surface of the upper frame 110.

The upper fixed terminal accommodating portion 112 is disposed to enclose the fixed terminal part 320. That is, the fixed terminal part 320 is enclosed by the upper fixed terminal accommodating portion 112.

The upper fixed terminal accommodating portion 112 may be provided in plurality. The number of upper fixed terminal accommodating portions 112 is the same as the number of fixed terminal parts 320 coupled to the upper frame 110. In the illustrated embodiment, three pairs of upper fixed terminal accommodating portions 112 are disposed side by side in the front and rear directions.

The number of upper fixed terminal accommodating portions 112 may be determined according to a type of power system in which the load switch 1 of the present disclosure is disposed. In one embodiment, the load switch 1 is disposed in a power system using a three-phase circuit of R, S, and T phases. Accordingly, the upper fixed terminal accommodating portions 112 are also provided as three pairs to correspond to the three-phase circuit.

The lower frame 120 is coupled to a lower side of the upper frame 110.

The lower frame 120 defines lower appearance of the load switch 1.

The lower frame 120 is disposed adjacent to the upper frame 110. In addition, the lower frame 120 is disposed below the upper frame 110.

The lower frame 120 is symmetrical to the upper frame 110 with respect to the rotating shaft 40. In the illustrated embodiment, the upper frame 110 and the lower frame 120 are disposed to be vertically symmetrical with respect to the rotating shaft 40.

The lower frame 120 is formed in a semi-cylindrical shape. Specifically, the lower frame 120 has a semi-cylindrical shape with a curved portion facing downward. At this time, an outer circumference of the lower frame 120 is formed in a shape corresponding to the shape of the arc chute 50.

An upper end portion of the lower frame 120 is in contact with a lower end portion of the upper frame 110. In addition, an upper end portion of the lower frame 120 is formed in a shape corresponding to a lower end portion of the upper frame 110.

The arc chute 50 is coupled in close contact with an outer circumferential surface of the lower frame 120. To this end, a lower fastening wing 121 may be formed on the outer circumference of the lower frame 120. That is, the lower fastening wing 121 is coupled to be in close contact with the arc chute 50.

A lower fastening wing hole 121*a* is formed in the lower fastening wing 121.

The lower fastening wing 121 and the lower fastening wing hole 121*a* correspond to the upper fastening wing 111 and the upper fastening wing hole 111*a* of the upper frame 110, respectively, in view of the functions and structures. Therefore, a redundant description thereof will be omitted.

In addition, a lower fixed terminal accommodating portion 122 in which the fixed terminal part 320 is accommodated protrudes from an outer circumference of the lower frame 120. In the illustrated embodiment, the lower fixed terminal accommodating portion 122 extends downward from a lower outer circumferential surface of the lower frame 120.

The lower fixed terminal accommodating portion 122 corresponds to the upper fixed terminal accommodating portion 112 of the upper frame 110 in view of function and structure. Therefore, a redundant description thereof will be omitted.

The fixing part 20 allows the frame part 10 to be firmly installed in a main body of a ring main unit, a switchboard, or the like.

The fixing part 20 is disposed adjacent to the frame part 10. In the illustrated embodiment, the fixing part 20 is disposed at a rear side of the frame part 10.

The fixing part 20 is disposed between the frame part 10 and a specific member (not illustrated) on which the load switch 1 is installed, and coupled to each of the frame part 10 and the specific member. That is, the frame part 10 and the specific member may be coupled by the fixing part 20.

Accordingly, the load switch 1 can be operated in a state in which the frame part 10 is coupled to the specific member without being separated from the specific member.

The fixing part 20 may be formed of a material having high stiffness. For example, the fixing part 20 may be formed of a metal material. This can result in suppressing data to the fixing part 20 and separation of the frame part 10 due to external impact.

In the illustrated embodiment, the fixing part 20 includes a fixing plate 210 and a support 220.

The fixing plate 210 is a member on which the fixing part 20 is directly coupled to the specific member.

The fixing plate 210 is formed on one side of the fixing part 20 opposite to the frame part 10. In the illustrated embodiment, the fixing plate 210 is formed on a rear side of the fixing part 20.

The fixing plate 210 is formed in a plate shape. In one embodiment, a through hole may be formed through a central portion of the fixing plate 210. Therefore, the fixing plate can be made lighter.

In the illustrated embodiment, the fixing plate 210 is formed in a rectangular plate shape with a through hole formed in a central portion. In the embodiment, a center point of the fixing plate 210 is located on an extension line of a center line of the frame part 10.

A fixing hole 211 may be formed through the fixing plate 210.

In one embodiment, a member by which the specific member and the fixing plate 210 are coupled to each other may be coupled through the fixing hole 211. At this time, the specific member is preferably provided with a through hole that communicates with the fixing hole 211.

The support 220 is disposed between the fixing plate 210 and the frame part 10.

The support 220 is disposed between the fixing plate 210 and the frame part 10, and coupled to each of the fixing plate and the frame part 10. That is, the fixing plate 210 and the frame part 10 may be coupled through the support 220. Accordingly, the frame part 10 may be spaced apart from the fixing plate 210.

The support 220 is coupled to one surface of the fixing plate 210 facing the frame part 10. In addition, the support 220 is coupled to one side of the frame part 10 facing the support 220. The coupling may be made in a bolt coupling manner.

The support 220 extends in a direction toward the frame part 10 and the fixing plate 210. In the illustrated embodiment, the support 220 extends in the front and rear directions.

In one embodiment, the support 220 may be provided in plurality. In the embodiment, the plurality of supports 220 are disposed such that center points thereof are the same as the center point of the fixing plate 210.

(3) Description of Opening and Closing Part 30

Figure 4:
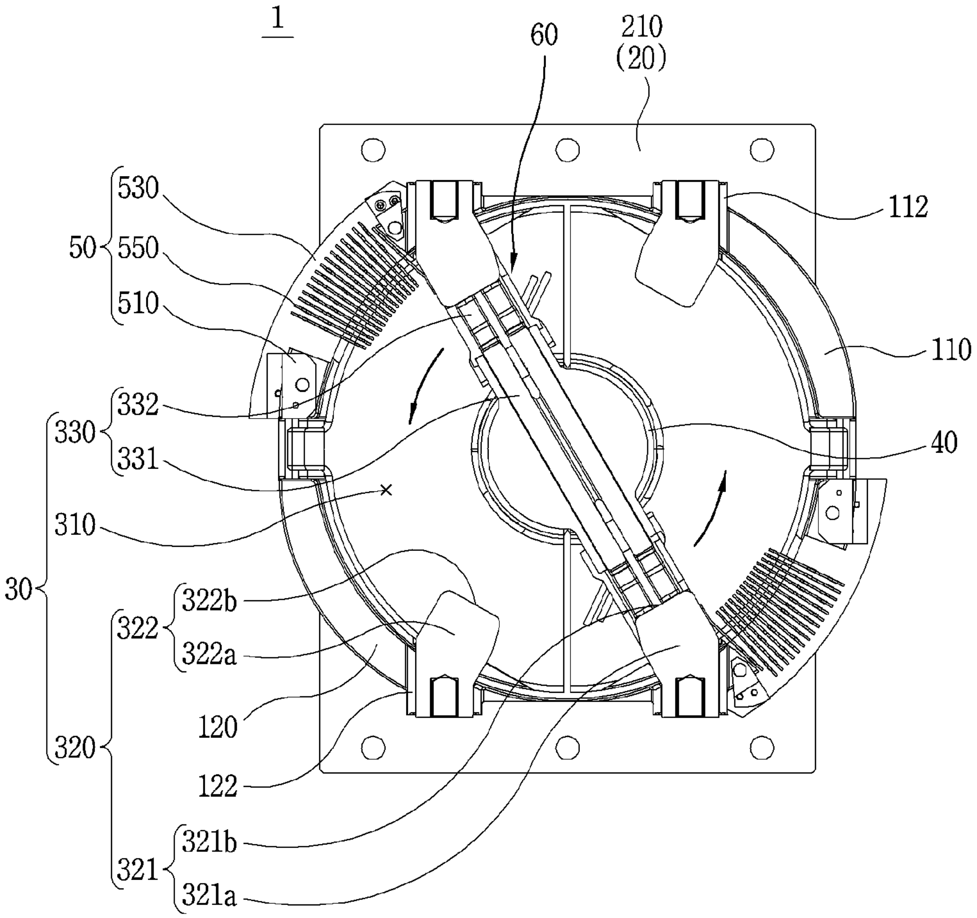
FIG. 4 is a front cross-sectional view illustrating the load switch of FIG. 1.
Figure 5:
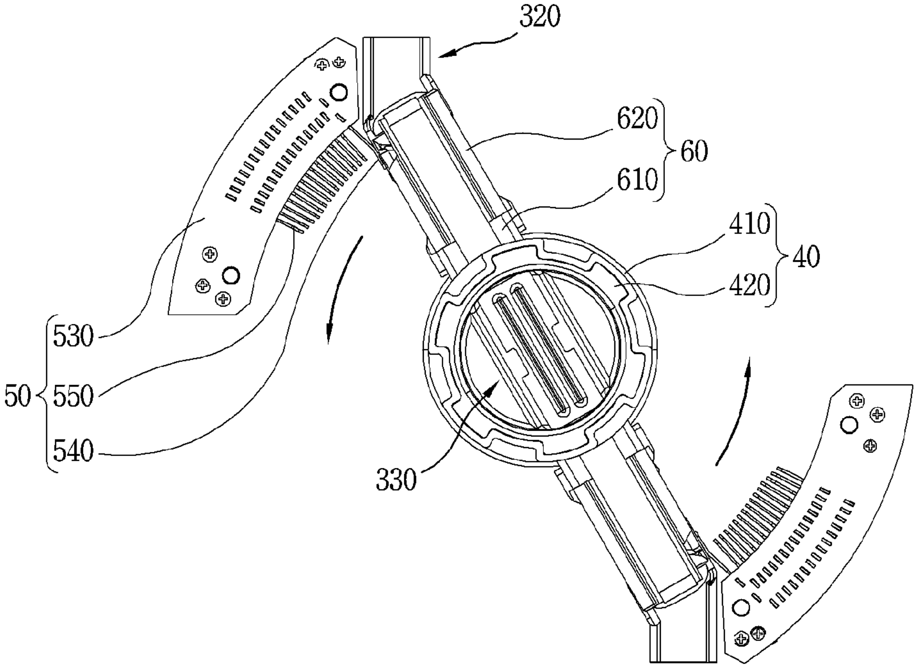
FIG. 5 is a front view illustrating an opening and closing part, a rotating shaft, an arc chute, and a puffer guide disposed in the load switch of FIG. 1.
Figure 6:
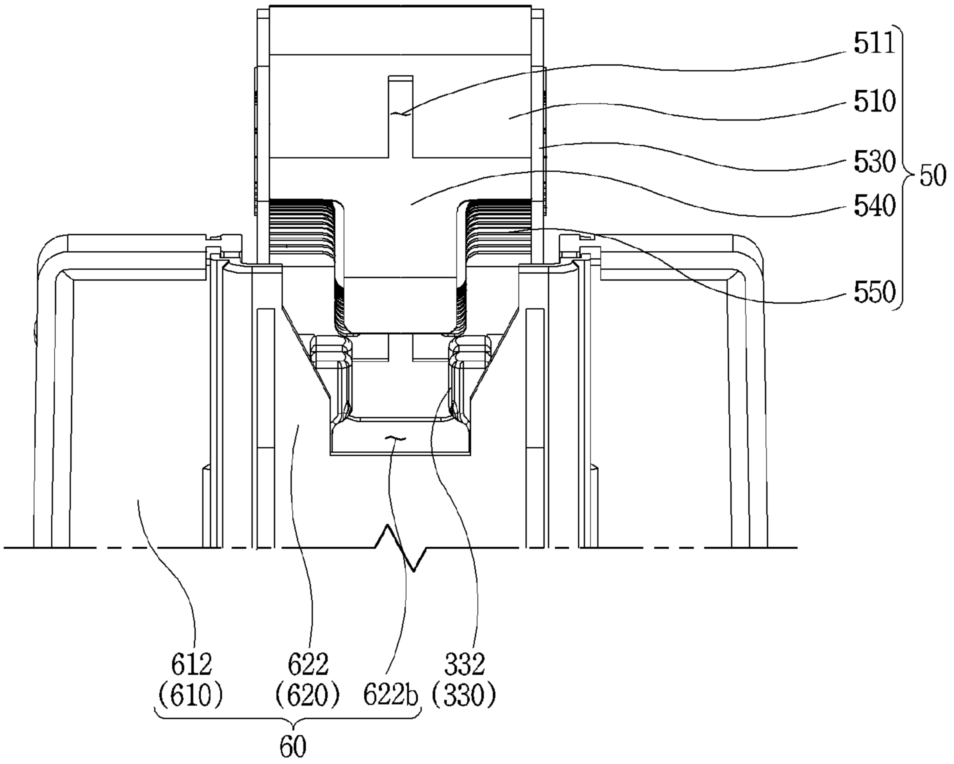
FIG. 6 is a lateral view illustrating the arc chute and the puffer guide of FIG. 5.
Figure 7:
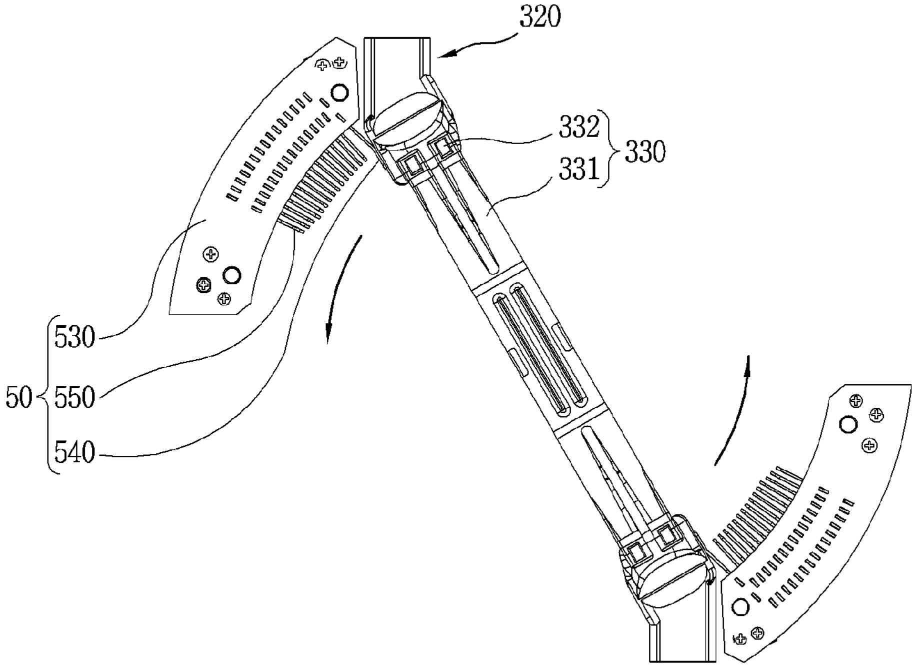
FIG. 7 is a front view illustrating the opening and closing part and the arc chute included in the load switch of FIG. 1.
Figure 8:
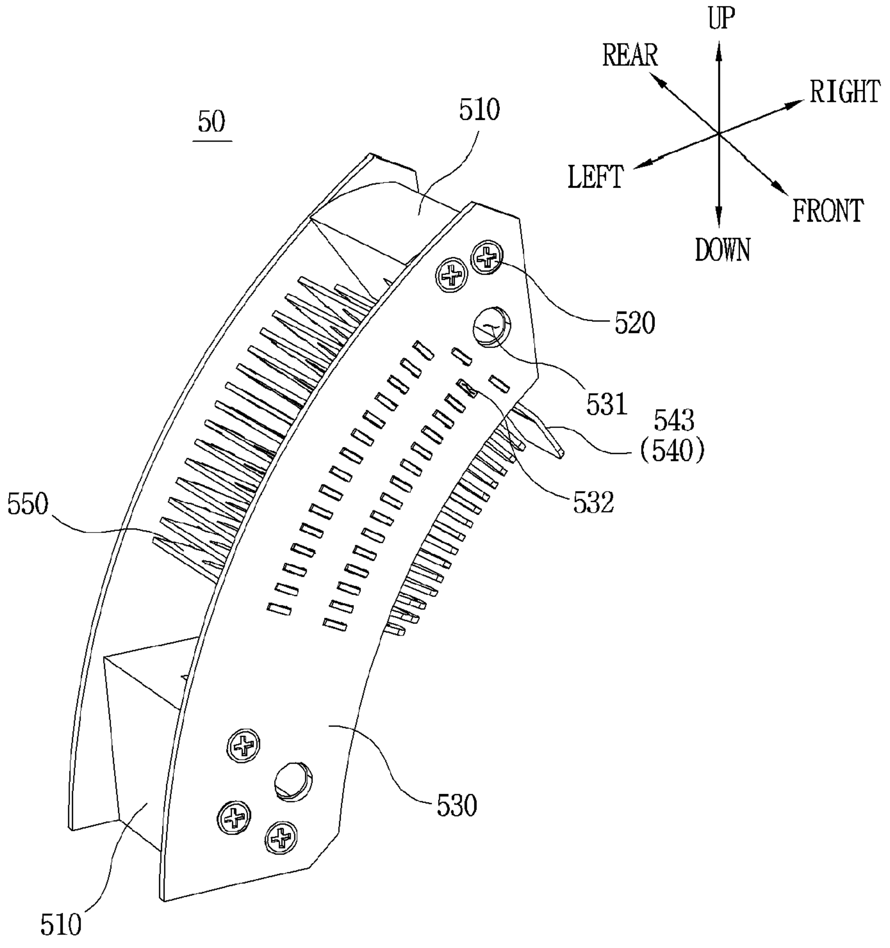
FIG. 8 is a perspective view illustrating the arc chute disposed in the load switch of FIG. 1.
Figure 9:
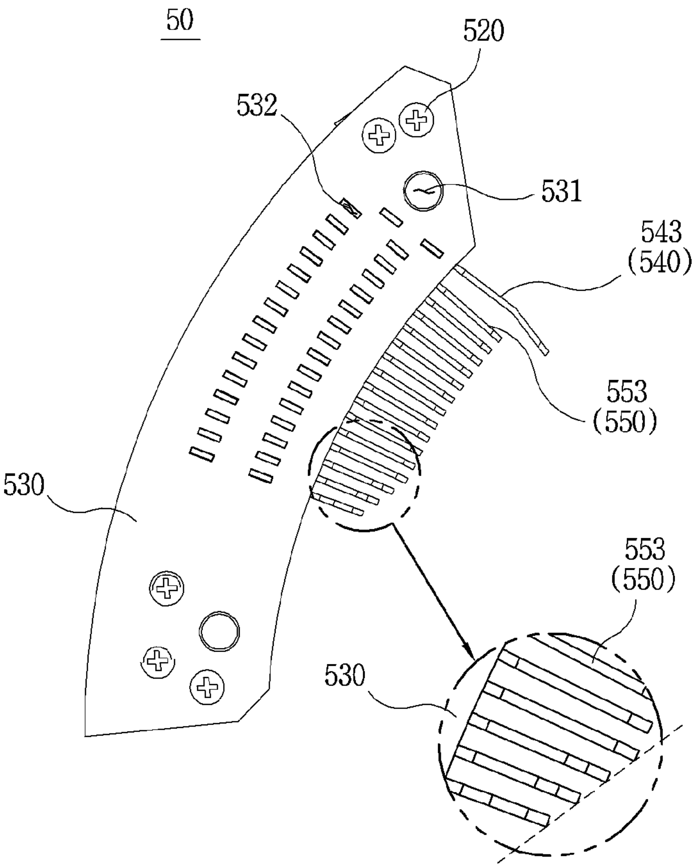
FIG. 9 is a front view illustrating the arc chute of FIG. 8.
Figure 10:
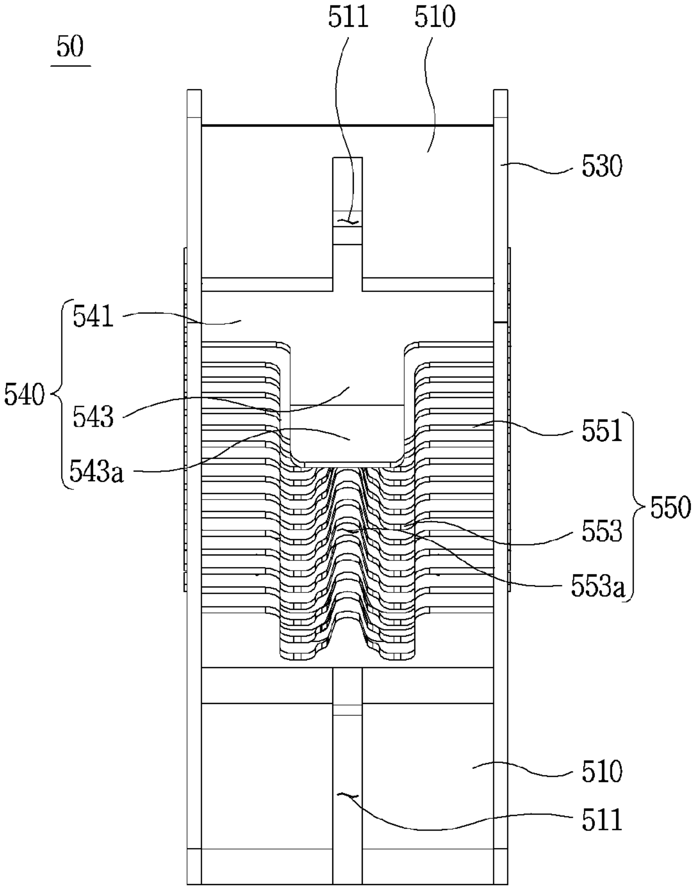
FIG. 10 is a lateral view illustrating the arc chute of FIG. 8.
Figure 11:
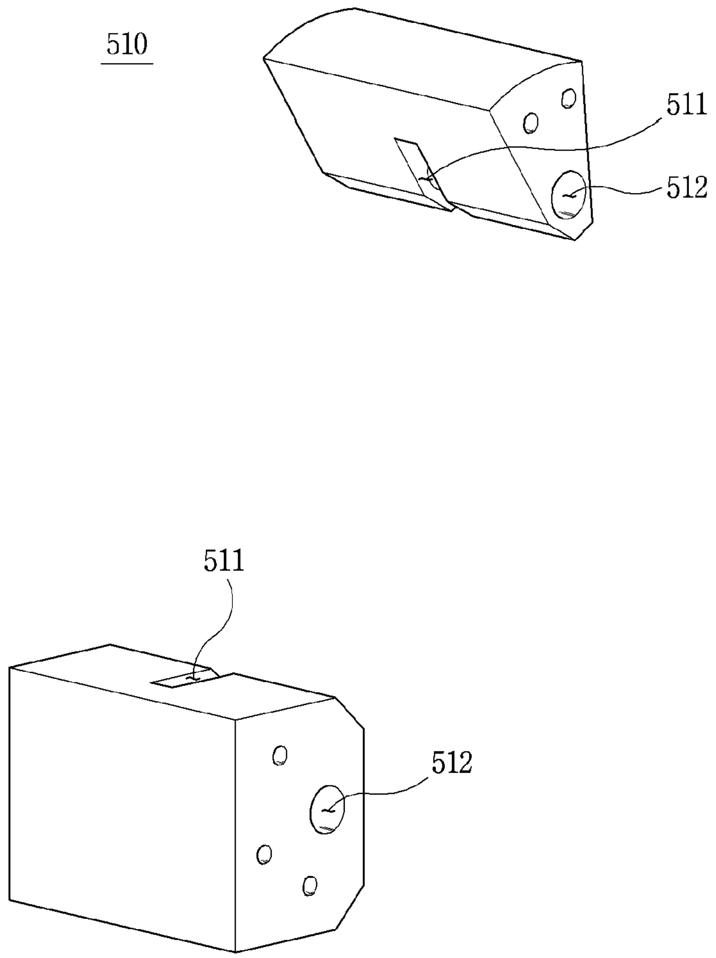
FIG. 11 is a perspective view illustrating a fastening portion disposed in the arc chute of FIG. 8.
Figure 12:
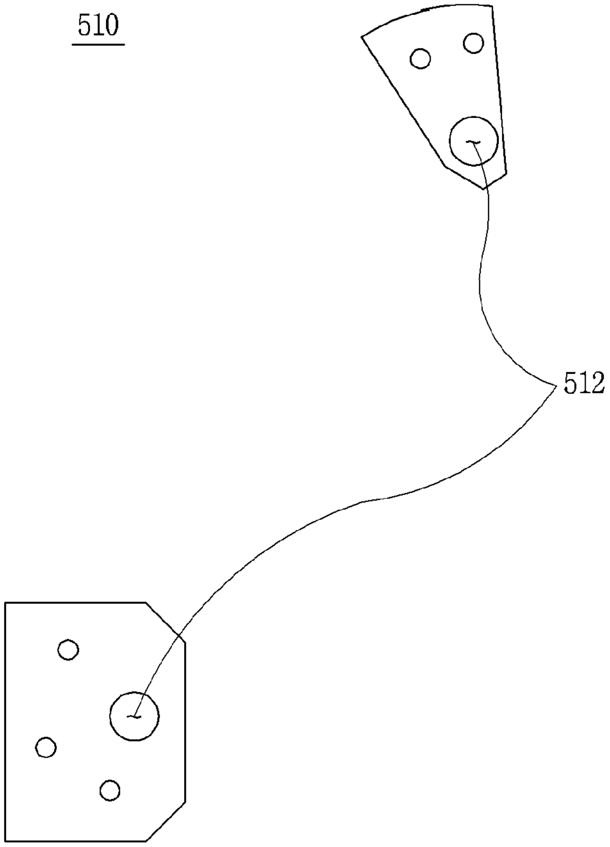
FIG. 12 is a front view illustrating the fastening portion of FIG. 11.
Figure 13:
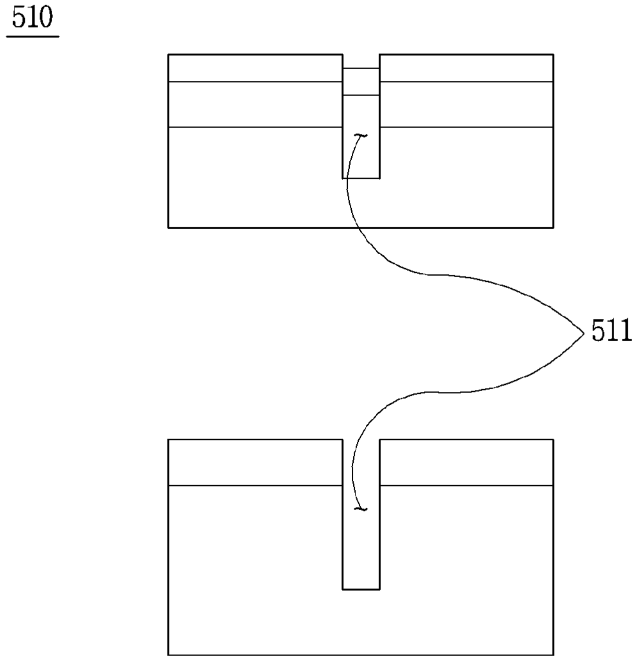
FIG. 13 is a lateral view illustrating the fastening portion of FIG. 11.
Figure 14:
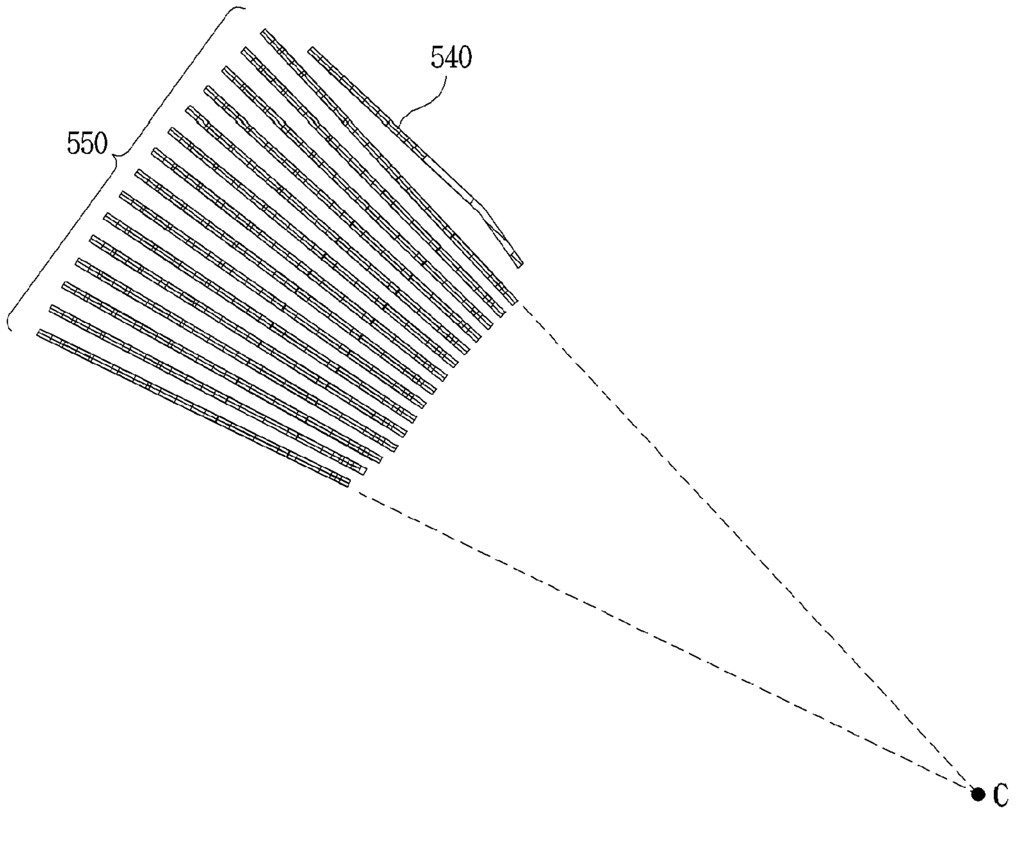
FIG. 14 is a conceptual view illustrating an arc runner and an arc grid disposed in the arc chute of FIG. 8.
Figure 15:
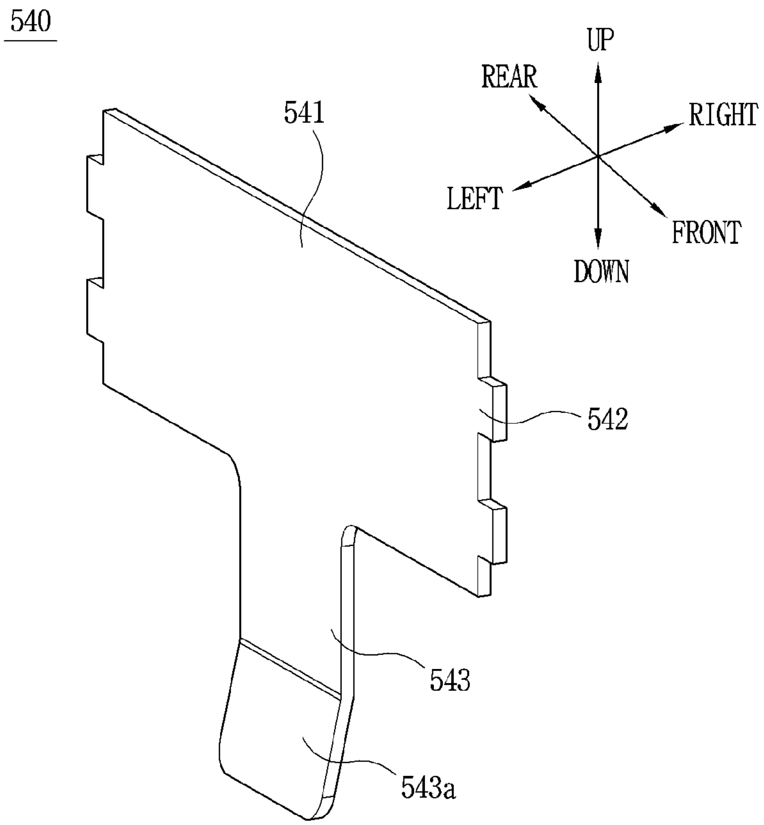
FIG. 15 is a perspective view illustrating the arc runner disposed in the arc chute of FIG. 8.

Hereinafter, the opening and closing part 30 will be described with reference to FIGS. 4 to 6.

The opening and closing part 30 is accommodated in the inner space of the frame part 10 to allow or block a flow of current. Specifically, in the opening and closing part 30, the fixed contact **321*b*, 322*b* and the movable contact 332 are brought into contact with each other to allow current to flow, or the fixed contact 321*b*, 322*b* and the movable contact 332** are separated from each other to block the flow of current.

The opening and closing part 30 may be provided in plurality. In the illustrated embodiment, three opening and closing parts 30 are disposed side by side in the front and rear directions.

The number of opening and closing parts 30 may be determined according to a type of power system in which the load switch 1 of the present disclosure is disposed. When the load switch 1 is disposed in a power system using a three-phase circuit of R, S, and T phases, three opening and closing parts 30 may be disposed to correspond to the three-phase circuit.

In the illustrated embodiment, the opening and closing part 30 includes an arc chamber 310, a fixed terminal part 320, and a movable terminal part 330.

The arc chamber 310 may also be referred to as "arc extinguishing unit". The arc chamber 310 extinguishes an arc that is generated when the fixed contact **321*b*, 322*b* and the movable contact 332 are separated from each other. Specifically, the arc chamber 310** defines a space in which the arc is extinguished.

Gas inside the space may be momentarily compressed by pressure generated when the movable terminal part 330 moves. At this time, the gas may flow in a direction opposite to a rotating direction through the puffer guide 60. During the process, the gas may flow through the puffer guide 60 at high speed and thus an arc extinguishing operation may be performed.

The arc chamber 310 may hermetically accommodate the fixed terminal part 320 and the movable terminal part 330. That is, the fixed terminal part 320 and the movable terminal part 330 are accommodated in the arc chamber 310. Accordingly, the arc generated when the fixed contact **321*b*, 322*b* and the movable contact 332 are separated from each other may not arbitrarily leak to the outside of the arc chamber 310**.

The fixed contact unit 320 is electrically connected to an external power source or load. The load switch 1 may be electrically connected to the external power source or load through the fixed terminal part 320.

A portion of the fixed terminal part 320 is accommodated inside the arc chamber 310.

The fixed terminal part 320 may be formed of a conductive material. For example, the fixed terminal part 320 may be formed of copper (Cu), silver (Ag), or the like.

In addition, one portion of the fixed terminal part 320 may be accommodated in the inner space of the frame part 10, so that an electrical connection between inside and outside of the load switch 1 can be allowed or blocked. Specifically, the fixed terminal part 320 may be brought into contact with or separated from the movable terminal part 330, such that the inside and the outside of the load switch 1 can be electrically connected or disconnected.

The fixed terminal part 320 is coupled through the fixed terminal accommodating portion 112 122 of the frame part 10. The fixed terminal part 320 is enclosed by the fixed terminal accommodating portion 112 122 and seals the fixed terminal accommodating portion 112 122. That is, movement of materials through the fixed terminal accommodating portion 112 122 is blocked by the fixed terminal part 320.

The fixed terminal part 320 does not move in the inner space of the frame part 10. Accordingly, the contact and separation between the fixed terminal part 320 and the movable terminal part 330 are achieved by the movement of the movable terminal part 330.

The remaining portion of the fixed terminal part 320 except for the one portion is exposed to the outside of the frame part 10. The remaining portion may be electrically connected to an external power source or load through a lead wire member (not illustrated) or the like.

The fixed terminal part 320 may be provided in plurality. The number of fixed terminal parts 320 is the same as the number of fixed terminal accommodating portions 112 and 122 disposed in the frame part 10.

In the illustrated embodiment, four fixed terminal parts 320 are disposed as one group, and three groups of fixed terminal parts 320 are disposed side by side in the front and rear directions. In the embodiment, two of the fixed terminal parts 320 facing each other with the rotating shaft 40 interposed therebetween are disposed to be point-symmetrical with respect to the central axis of the rotating shaft 40.

The two fixed terminal parts 320 facing each other with the rotating shaft 40 interposed therebetween may be electrically connected to each other. The connection is made as the movable terminal part 330 is brought into contact with each of the two fixed terminal parts 320.

In the illustrated embodiment, the fixed terminal parts 320 include a first fixed terminal part 321 and a second fixed terminal part 322.

The first fixed terminal part 321 is electrically connected to the external power source and load or electrically connected to a ground line. The second fixed terminal part 322 is electrically connected to the ground line or electrically connected to the external power source and load.

The movable terminal part 330 may be movable to be brought into contact with or separated from the first fixed terminal part 321 or the second fixed terminal part 322. However, the movable terminal part 330 may not be brought into contact with the first fixed terminal part 321 and the second fixed terminal part 322 at the same time, but may be brought into contact with only one of the first fixed terminal part 321 and the second fixed terminal part 322.

Specifically, the movable terminal part 330 may rotate toward the fixed terminal part 320 or away from the fixed terminal part 320.

When the movable terminal part 330 rotates in the direction away from the fixed terminal part 320, the movable terminal part 330 and the fixed terminal part 320 are separated from each other, and an arc is generated between the movable terminal part 330 and the fixed terminal part 320.

In one embodiment, the first fixed terminal part 321 may be electrically connected to the external power source and load, and the second fixed terminal part 322 may be electrically connected to the ground line.

In the above embodiment, when the movable terminal part 330 is brought into contact with the first fixed terminal part 321, current may be applied between the external power source and load. Also, when the movable terminal part 330 is brought into contact with the second fixed terminal part 322, the movable terminal part 330 is electrically connected to the ground line and the electrical connection between the external power source and load is blocked.

When the movable terminal part 330 is separated from the first fixed terminal part 321 and the second fixed terminal part 322, current outside the load switch 1 is not transferred to the inside of the load switch 1.

In the illustrated embodiment, the fixed terminal part 321 includes a first fixed contact holder 321*a* and a first fixed contact 321*b*.

The fixed contact holder 410 may be electrically connected to the external power source or load.

One portion of the first fixed contact holder 321*a* is accommodated in the inner space of the frame part 10, and the remaining portion thereof is exposed to the outside of the frame part 10. Specifically, the one portion of the first fixed contact holder 321*a* is enclosed by the fixed terminal accommodating portion 112, 122.

The first fixed contact holder 321*a* may be provided in plurality. In the illustrated embodiment, a total of twelve first fixed contact holders 321*a* are provided, six on an upper side and six on a lower side of the frame part 10.

In one embodiment, the first fixed contact holder 321*a* may have a cylindrical shape that is bent and extends in a direction toward the rotating shaft 40.

The first fixed contact 321*b* is disposed on one end portion of the first fixed contact holder 321*a* that faces the rotating shaft 40.

The first fixed contact 321*b* is disposed adjacent to the first fixed contact holder 321*a*. In addition, the first fixed contact 321*b* is electrically connected to the first fixed contact holder 321*a*.

The first fixed contact 321*b* and may be brought into contact with or separated from the movable contact 332. Accordingly, the load switch 1 may be electrically connected to or disconnected from the external power source or load.

In one embodiment, the first fixed contact 321*b* may be integrally formed with the first fixed contact holder 321*a*.

The second fixed terminal part 322 is spaced apart from the first fixed terminal part 321.

The second fixed terminal part 322 is electrically connected to a member, which is not connected to the first fixed terminal part 321, among the external power source, the external load, and the ground line.

That is, when the first fixed terminal part 321 is electrically connected to the external power source and load, the second fixed terminal part 322 is electrically connected to the ground line.

In the illustrated embodiment, the second fixed terminal part 322 includes a second fixed contact holder 322*a* and a second fixed contact 322*b*.

The second fixed contact holder 322*a* and the second fixed contact 322*b* correspond to the first fixed contact holder 321*a* and the first fixed contact 321*b* in view of their functions and structures. Therefore, a redundant description thereof will be omitted.

Also, the movable terminal part 330 is electrically connected to or disconnected from the fixed terminal part 320. The plurality of fixed terminal parts 320 may be electrically connected together through the movable terminal part 330. Accordingly, the load switch 1 can be electrically connected to the external power source or load.

The movable terminal part 330 is accommodated in the inner space of the frame part 10. The movable terminal part 330 is rotatably coupled to the inner space of the frame part 10.

The movable terminal part 330 is coupled to the rotating shaft 40. When the rotating shaft 40 rotates, the movable terminal part 330 may also rotate together with the rotating shaft 40.

In addition, a portion of the movable terminal part 330 is accommodated in the puffer guide 60.

The movable terminal part 330 may be provided in plurality. In the illustrated embodiment, the load switch 1 is provided with three pairs of movable terminal parts 330. The three pairs of movable terminal parts 330 are disposed side by side in the front and rear directions.

The plurality of movable terminal parts 330 may be brought into contact with or separated from the plurality of fixed terminal parts 320 to be electrically connected or disconnected. That is, the movable terminal part 330 may be rotated to be brought into contact with the fixed terminal part 320 or rotated to be separated from the fixed terminal part 320. The contact and separation may be achieved according to the rotation of the rotating shaft 40 connected to the movable terminal part 330.

When the movable terminal part 330 is brought into contact with the first fixed terminal part 320 that is connected to the external power source and load, current may be applied between the external power source and load.

Also, when the movable terminal part 330 is brought into contact with the fixed terminal part 320 connected to the ground line, the movable terminal part 330 is electrically connected to the ground line and the electrical connection between the external power source and load is blocked.

The movable terminal part 330 may be formed of a conductive material. For example, the movable terminal part 330 may be formed of copper, silver, or the like.

In the illustrated embodiment, the movable terminal part 330 includes a movable contact holder 331 and a movable contact 332.

The movable contact holder 331 is directly coupled to the rotating shaft 40 and rotates together with the rotating shaft 40. The movable contact holder 331 may be rotated clockwise or counterclockwise by the rotating shaft 40.

In one embodiment, the movable contact holder 331 is disposed so that its center point is as aligned with the center point of the rotating shaft 40.

The movable contact holder 331 is formed in a bar shape extending in a predetermined direction. The predetermined direction may be a radial direction of the rotating shaft 40. In one embodiment, the movable terminal part 330 is bent and extends toward the fixed terminal part 320.

In the illustrated embodiment, both end portions of the movable contact holder 331 in the radial direction of the rotating shaft 40 are separated into two parts. The movable contact 332 is formed on each of the both end portions.

The movable contact 332 is electrically connected to the movable contact holder 331.

The movable contact 332 is brought into contact with or separated from the fixed contact **321*b*, 322*b*. Accordingly, the load switch 1** may be electrically connected to or disconnected from the external power source or load.

The movable contact 332 is located on each of both ends of the movable contact holder 331. That is, the movable contact 332 is located radially outward with respect to the rotating shaft 40.

In one embodiment, the movable contact 332 is disposed to be enclosed by the puffer guide 60. In another embodiment, the movable contact 332 is disposed at a radial outside of the puffer guide 60 with respect to the rotating shaft 40. That is, in the above embodiment, the movable contact 332 is exposed to the outside of the puffer guide 60 without being enclosed by the puffer guide 60.

The movable contact 332 may be provided in plurality. In the illustrated embodiment, two movable contacts 332 are located on each of the both end portions of the movable contact holder 331. That is, the movable contact holder 331 is provided with a total of four movable contacts 332.

When the rotating shaft 40 rotates, the movable contact 332 rotates together with the rotating shaft 40. The movable contact 332 is accommodated in the inner space of the frame part 10 so as to be rotatable with respect to the rotation axis of the rotating shaft 40.

In one embodiment, the movable contact 332 may be formed integrally with the movable contact holder 331.

(4) Description of Rotating Shaft 40

Hereinafter, the rotating shaft 40 will be described with reference to FIGS. 4 to 7.

The rotating shaft 40 is connected to the movable terminal part 330 and rotates together with the movable terminal part 330. By rotation of the rotating shaft 40, the movable terminal part 330 may be electrically brought into contact with or separated from the fixed terminal part 320.

The rotating shaft 40 is rotatably coupled to the frame part 10.

Specifically, the rotating shaft 40 is rotatably accommodated in the inner space of the frame part 10.

The rotating shaft 40 is connected to the movable terminal part 330. In the illustrated embodiment, the plurality of movable terminal parts 330 are coupled through the rotating shaft 40.

In addition, the rotating shaft 40 is electrically connected to the movable terminal part 330. Accordingly, current introduced into the load switch 1 through the fixed terminal part 320 may proceed toward another fixed terminal part 320 through the movable terminal part 330 and the rotating shaft 40.

The puffer guide 60 is coupled to one side of the rotating shaft 40. In one embodiment, an inner space of the puffer guide 60 and the inner space of the rotating shaft 40 are in communication with each other.

In addition, the rotating shaft 40 may be connected to a handle (not illustrated) or a manipulation unit (not illustrated). Rotation of the rotating shaft 40 may be manually manipulated by the handle or automatically manipulated by the manipulation unit.

In the illustrated embodiment, the rotating shaft 40 rotates clockwise or counterclockwise centering on a central axis.

The rotating shaft 40 rotates and accordingly the movable terminal part 330 rotates. That is, the movable terminal part 330 may be rotated in a direction toward the fixed terminal part 320 or away from the fixed terminal part 320 by the rotating shaft 40.

The rotating shaft 40 is formed in a cylindrical shape. In one embodiment, a center point of the rotating shaft 40 is located coaxially with a center point of the movable terminal part 330.

The rotating shaft 40 may be provided in plurality. The number of rotating shafts 40 is equal to the number of movable terminal parts 330. In the illustrated embodiment, three rotating shafts 40 are disposed side by side along the front and rear directions.

The number of rotating shafts 40 may be determined according to a type of power system in which the load switch 1 of the present disclosure is provided. When the load switch 1 is provided in a power system using a three-phase circuit of phases R, S, and T phases, three rotating shafts 40 may also be provided to correspond to the three-phase circuit.

In the illustrated embodiment, the rotating shaft 40 includes a column portion 410 and a concave-convex portion 420.

The column portion 410 defines appearance of the rotating shaft 40.

The movable terminal part 330 is coupled through the column portion 410 to rotate together with the column portion 410 of the rotating shaft 40.

The column portion 410 is disposed between two opposing puffer guides 60 and is coupled to each of the two puffer guides 60.

The column portion 410 is formed in a cylindrical shape. In the illustrated embodiment, a hollow hole is formed in a central portion of the column portion 410.

The concave-convex portion 420 is formed on each of both ends of the column portion 410.

The concave-convex portions 420 more firmly couples two rotating shafts 40 adjacent to each other.

The concave-convex portion 420 of any one of the two adjacent rotating shafts 40 is disposed adjacent to the concave-convex portion 420 of the other rotating shaft 40.

The concave-convex portions 420 of the two rotation shafts 40 are formed to correspond to each other. Accordingly, the concave-convex portions 420 of the two rotating shafts 40 may be engaged with each other. Accordingly, when one rotating shaft 40 rotates, the other rotating shafts 40 may also rotate together.

2. Description of Arc Chute 50 and Puffer Guide 60 According to One Embodiment of the Present Disclosure Hereinafter, the arc chute 50 and the puffer guide 60 according to one embodiment of the present invention will be described with reference to FIGS. 5 to 23.

The arc chute 50 increases a length of an arc generated when opening/closing and cutting off current, thereby cooling and extinguishing the arc.

The arc chute 50 is disposed adjacent to an outer circumference of the frame part 10. Specifically, the arc chute 50 is closely in contact with the outer circumference of the frame part 10.

The arc chute 50 is coupled to the frame part 10. At this time, the arc chute 50 is coupled to the fastening wing 111, 121 of the frame part 10. Specifically, the fastening wing 111, 121 is inserted into the fastening groove 511 of the arc chute 50.

In addition, a portion of the arc chute 50 is inserted into the inner space of the frame part 10 and the arc chamber 310.

The arc chute 50 is formed in a curved shape. This may facilitate the arc chute 50 to be installed in the rotary load switch 1.

In addition, the arc chute 50 extends along a circumferential direction of the frame part 10.

In one embodiment, the arc chute 50 may be formed in a shape corresponding to the outer circumference of the frame part 10. In another embodiment, a radius of curvature of the arc chute 50 may be the same as a radius of curvature of the frame part 10. Accordingly, the arc chute 50 may be disposed to be in close contact with the outer circumferential surface of the frame part 10.

The arc chute 50 may be provided in plurality. In the illustrated embodiment, two arc chutes 50 are provided as a pair. This is to cope with an arc generated when the movable terminal part 330 in contact with the two fixed contacts **321*b* and 322*b* is separated from the two fixed contacts 321*b* and 322*b*** at the same time.

In the embodiment, the two arc chutes 50 facing each other with the rotating shaft 40 interposed therebetween are disposed to be point-symmetrical with respect to the central axis of the rotating shaft 40. This can maximize arc extinguishing capability of the arc chute 50.

The arc chute 50 is not limited to the illustrated shape and may be formed in various shapes. In one embodiment, three pairs of arc chutes 50 may be provided. In the embodiment, the three pairs of arc chutes 50 may be disposed side by side along the front and rear directions.

It will be understood that the direction of the coordinate system used in the description of the arc chute 50 may change depending on an installation position of the arc chute 50.

In the illustrated embodiment, the arc chute 50 includes a fastening portion 510, a coupling member 520, a cover part 530, an arc runner 540, and an arc grid 550.

The fastening portion 510 is a member by which the arc chute 50 is directly coupled to the frame part 10.

The fastening portion 510 is disposed adjacent to the outer circumference of the frame part 10. In addition, the fastening part 510 is coupled to the fastening wing 111, 121 of the frame part 10.

The fastening portion 510 overlaps the fastening wing 111, 121 in a predetermined direction. At this time, the predetermined direction is an axial direction of the frame part 10.

The fastening portion 510 is disposed between a plurality of cover parts. In the illustrated embodiment, the fastening portion is disposed between two cover parts 530 to be coupled to each of the cover parts 530. In the embodiment, the fastening portion 510 is disposed so that its front side and rear side are covered by the cover parts 530.

The fastening portion 510 may be provided in plurality. The number of fastening portions 510 is the same as the number of fastening wings 111, 121 of the frame part 10. In the illustrated embodiment, the arc chute 50 is provided with two fastening portions 510. In the above embodiment, the arc runner 540 and the arc grid 550 are disposed between the two fastening portions 510.

In one embodiment, the fastening portion 510 may be provided with a fastening hole 512 communicating with a through hole of the cover part 530. The fastening hole 512 is formed through the frame part 10 in the axial direction.

In the illustrated embodiment, a fastening groove 511 is recessed in the fastening portion 510.

The fastening groove 511 is recessed in one surface of the fastening portion 510, which comes in contact with the outer circumferential surface of the frame part 10, radially outward of the frame part 10. In addition, the fastening groove 511 extends along the radial direction of the frame part 10.

In one embodiment, the fastening groove 511 is formed in a shape corresponding to the fastening wing 111, 121. This assists in a more secure coupling between the fastening groove 511 and the fastening wing 111, 121.

The fastening groove 511 is coupled to the fastening wing 111, 121 of the frame part 10. Specifically, the fastening wing 111, 121 is inserted into the fastening groove 511. To this end, it is preferable that a thickness of the fastening groove 511 is thicker than that of the fastening wing 111, 121.

The fastening hole 512 is formed through the fastening portion 510 in a predetermined direction. In addition, the fastening hole 512 is formed through the fastening groove 511. In one embodiment, the predetermined direction is the axial direction of the frame part 10.

The fastening hole 512 is located on a straight line with a cover coupling hole 531 of the cover part 530 and a fastening wing hole **111*a*, 121*a* of the fastening wing 111, 121**.

The coupling member 520 is inserted through the fastening portion 510 and the coupling wing 111, 121 of the frame part 10, so as to further strengthen the coupling of the fastening portion 510 and the coupling wing 111, 121.

Specifically, the coupling member 520 is inserted through the fastening hole 512 of the fastening portion 510, the cover coupling hole 531 of the cover part 530, and the fastening wing hole **111*a*, 121*a* of the fastening wing 111, 121. The coupling member 520 is not limited to the illustrated shape and may be formed in various shapes. In one embodiment, the coupling member 520 may be coupled to the arc chute 50 and the frame part 10** in a bolt coupling manner.

The cover member 520 may be formed of a material having high rigidity. The cover member 520, for example, may be formed of a metal material.

The cover part 530 may be tightly coupled to the fastening portion 510, the arc runner 540, and the arc grid 550 by the coupling member 520.

The cover part 530 may define the appearance of the arc chute 50. The cover part 530 supports the fastening portion 510, the arc runner 540, and the arc grid 550 in both directions. In the illustrated embodiment, the cover part 530 supports the fastening portion 510, the arc runner 540, and the arc grid 550 in the front and rear directions.

The cover part 530 is disposed adjacent to the frame part 10. Specifically, the cover part 530 is disposed adjacent to the outer circumference of the frame part 10 and the fixed terminal accommodating portion 112, 122.

The cover part 530 may be provided in plurality. In the illustrated embodiment, the arc chute 50 is provided with two cover parts 530. In the embodiment, the two cover parts 530 overlap each other in the axial direction of the frame part 10.

The fastening portion 510, the arc runner 540, and the arc grid 550 are disposed between the two cover parts 530 facing each other. At this time, runner coupling protrusions 542 of the arc runner 540 and grid coupling protrusions 552 of the arc grid 550 are inserted into the cover parts 530.

The cover part 530 extends in the circumferential direction of the frame part 10.

The cover part 530 may be formed in a plate shape including a plurality of curves. In one embodiment, the cover part 530 may be formed in a plate shape extending in the circumferential and radial directions of the frame part 10.

In the illustrated embodiment, the cover part 530 is formed in a plate shape extending radially outward from a predetermined arcuate portion. Accordingly, the cover part 530 may be closely attached onto the rotary load switch 1. That is, the cover part 530 may be easily installed on the rotary load switch 1.

In one embodiment, one side of the cover part 530 in contact with the outer circumference of the frame part 10 may be formed in a shape corresponding to the outer circumference of the frame part 10. Preferably, the one side of the cover part 530 in contact with the outer circumference of the frame part 10 has the same radius of curvature as the frame part 10. At this time, a center of curvature of the cover part 530 is the same as a center point of the frame part 10.

Accordingly, the one side of the cover part 530 may be more firmly attached to the outer circumference of the frame part 10.

Another side of the cover part 530 different from the one side is disposed adjacent to the fixed terminal part 320. In the illustrated embodiment, a right side of the cover part 530 is disposed adjacent to the fixed terminal part 320.

In the illustrated embodiment, a cover coupling hole 531 and a cover through hole 532 are formed in the cover part 530.

The cover coupling hole 531 is disposed adjacent to the fastening portion 510. In one embodiment, the cover coupling hole 531 may communicate with the fastening hole 512 of the fastening portion 510. In addition, the cover coupling hole 531 is spaced apart from the arc runner 540 and the arc grid 550.

The coupling member 520 is coupled through the cover coupling hole 531.

The cover coupling hole 531 may be provided in plurality. In one embodiment, the number of cover coupling holes 531 may be the same as the number of coupling members 520.

The cover through hole 532 is formed at a position spaced apart from the cover coupling hole 531.

The arc runner 540 and the arc grid 550 are inserted into the cover through hole 532. Specifically, the runner coupling protrusion 542 of the arc runner 540 and the grid coupling protrusion 552 of the arc grid 550 are inserted into the cover through hole 532.

The cover through hole 532 may be provided in plurality. The number of cover through holes 532 is equal to the sum of the number of runner coupling protrusions 542 and the number of grid coupling protrusions 552 disposed in the arc chute 50.

The plurality of cover through holes 532 are disposed at regular intervals along a predetermined curve. In one embodiment, a radius of curvature of the predetermined curve may be the same as that of the frame part 10.

The cover through holes 532 are formed in a shape corresponding to the runner coupling protrusion 542 and the grid coupling protrusion 552. In the illustrated embodiment, the cover through hole 532 is formed such that a rectangular cross-section thereof extends in the front and rear directions.

The arc runner 540 and the arc grid 550 are inserted between the two facing cover parts 530.

The arc runner 540 may maximize an arc induction effect of the arc chute 50.

The arc runner 540 is disposed between the fastening portion 510 and the arc grid 550.

The arc runner 540 is disposed between the arc grid 550 and the fixed terminal part 320. In addition, the arc runner 540 is disposed closer to the fixed terminal part 320 compared to the arc grid 550. In the illustrated embodiment, the arc runner 540 is disposed more to the right with respect to the arc grid 550.

One portion of the arc runner 540 is in contact with the fixed terminal part 320. Accordingly, when an arc is generated, the arc may be induced toward the arc runner 540. As a result, the arc induction effect can be maximized.

Another portion of the arc runner 540 is fixedly inserted into the cover part 530.

In one implementation, the arc runner 540 may be formed of a conductive material. The arc runner 540, for example, may be formed of a metal material.

In the illustrated embodiment, the arc runner 540 may be divided into a runner base portion 541, runner coupling protrusions 542, and a runner leg 543.

The runner base portion 541 defines a body of the arc runner 540.

Compared to a grid base portion 551 of the arc grid 550, the runner base portion 541 is disposed closer to the fixed terminal part 320. In the illustrated embodiment, the runner base portion 541 is disposed more to the right with respect to the grid base portion 551.

The runner base portion 541 is formed in a plate shape. In one embodiment, the runner base portion 541 extends in a widthwise direction. That is, a width of the runner base portion 541 is longer than a length thereof. In the illustrated embodiment, the widthwise direction indicates the front and rear directions, and the lengthwise direction indicates up and down directions.

Coupling protrusions are formed on one side of the runner base portion 541 facing the cover part 530. In the illustrated embodiment, the coupling protrusions are formed on front and rear sides of the runner base portion 541.

The runner coupling protrusions 542 fix the arc runner 540 to the cover part 530.

The runner coupling protrusions 542 are inserted into the cover through holes 532 of the cover part 530.

The runner coupling protrusions 542 extend toward the cover part 530 from one side of the runner base portion 541 that faces the cover part 530. In the illustrated embodiment, the runner coupling protrusion 542 extends from the front or rear side of the runner base portion 541 toward the front or rear side.

In one embodiment, the runner coupling protrusions 542 may be integrally formed with the runner base portion 541.

The runner leg 543 defines an arc induction path.

The runner leg 543 is disposed adjacent to the fixed terminal part 320.

The runner leg 543 extends toward the rotating shaft 40 from another side of the runner base portion 541, different from the one side of the runner base portion 541. Also, the runner leg 543 extends in the lengthwise direction. In the illustrated embodiment, the runner leg 543 extends downward from a lower side of the runner base portion 541.

The runner leg 543 extends in a direction toward the fixed terminal part 320. In addition, the runner leg 543 extends by being bent at a predetermined angle. The runner leg 543 is bent in a direction opposite to the fixed terminal part 320. In the illustrated embodiment, the bending direction is a left direction.

In one embodiment, the runner leg 543 may be integrally formed with the runner base portion 541 and the runner coupling protrusions 542.

A terminal contact portion 543*a* is formed on one end of the runner leg 543.

The terminal contact portion 543*a* is formed on one end of the runner leg 543 opposite to the runner base portion 541, based on a bending line of the runner leg 543. That is, the terminal contact portion 543*a* is located radially inside the frame part 10 based on the bending line of the runner leg 543.

In the illustrated embodiment, the terminal contact portion 543*a* is formed on a lower end of the runner leg 543. In the above embodiment, the terminal contact portion 543*a* is formed below the bending line of the runner leg 543.

The terminal contact portion 543*a* is directly in contact with the fixed terminal part 320. In one embodiment, the terminal contact portion 543*a* is in contact with the fixed contact 321*b*, 322*b* of the fixed terminal part 320.

The arc grid 550 is disposed on one side of the arc runner 540 opposite to the fixed terminal part 320.

The arc grid 550 defines a guide path of an arc generated when opening/closing and cutting off current.

The arc grid 550 is disposed between the two facing cover parts 530. A portion of the arc grid 550 is fixedly inserted into the cover through hole 532 of the cover part 530. That is, the arc grid 550 is disposed adjacent to the cover part 530.

In addition, the arc grid 550 is disposed to be spaced apart from the fixed terminal part 320.

The arc grid 550 extends in the radial direction of the frame part 10. Accordingly, the arc grid 550 may be adjacent to the movable terminal part 330 that rotates with respect to the central axis of the frame part 10.

The arc grid 550 may be provided in plurality. As the number of arc grids 550 increases, the arc elongation and cooling effect can be increased.

The plurality of arc grids 550 may be disposed at regular intervals along a predetermined curve. Accordingly, the arc induction and elongation effect can be increased.

In one embodiment, a radius of curvature of the predetermined curve may be the same as that of the frame part 10. In another embodiment, the predetermined curve may be formed in a shape corresponding to the outer circumference of the frame part 10. In the above embodiment, the arc grid 550 is disposed to correspond to one side of the cover part 530 that is in contact with the frame part 10.

In the illustrated embodiment, the plurality of arc grids 550 are disposed with a constant radius of curvature with respect to a center point C. The center point C is located at the central axis of the frame part 10 and the rotating shaft 40.

In the illustrated embodiment, the plurality of arc grids 550 decrease in length in a direction away from the fixed terminal part 320. Accordingly, an insulation distance with respect to the same number of arc grids 550 may be further increased. Furthermore, a regeneration of an arc due to a transient recovery voltage can be suppressed.

The plurality of arc grids 550 are disposed at a predetermined interval. In one embodiment, the predetermined interval may be larger than or equal to 1.4 times and less than or equal to 1.6 times the thickness of the arc grid 550. Preferably, the predetermined interval is 1.5 times the thickness of the arc grid 550.

The arc grid 550 is formed in a plate shape. In the illustrated embodiment, the arc grid 550 is formed to be symmetrical with respect to the front and rear and left and right directions.

In the embodiment illustrated in FIGS. 5 to 19, the arc chute 50 includes a plurality of arc grids 550 having the same shape.

In the embodiment illustrated in FIGS. 20 to 23, the arc chute 50 is provided with two arc grids 550 having different shapes. In the above embodiment, the two arc grids 550 having the different shapes are alternately disposed along the predetermined curve.

In one embodiment, the arc grid 550 may be formed of a conductive material. The arc grid 550, for example, may be formed of a metal material.

In the illustrated embodiment, the arc grid 550 may be divided into a grid base portion 551, grid coupling protrusions 552, and a grid leg 553. The grid base portion 551 defines a body of the arc grid 550.

The grid base portion 551 is disposed at one side of the arc runner 540 opposite to the fixed terminal part 320. In the illustrated embodiment, the grid base portion 551 is disposed more to the left with respect to the runner base portion 541 of the arc runner 540.

The grid base portion 551 is formed in a plate shape. In one embodiment, the grid base portion 551 extends in a widthwise direction. That is, a width of the grid base portion 551 is longer than a length thereof. In the illustrated embodiment, the widthwise direction indicates the front and rear directions, and the lengthwise direction indicates up and down directions.

An arc hole 551*a* may be formed through the grid base portion 551.

The arc hole 551*a* defines a detour path of an arc. Accordingly, the arc can be elongated and cooled more efficiently.

The arc hole 551*a* may be provided in plurality. In the illustrated embodiment, the arc grid 550 is provided with five arc holes 551*a*.

The grid coupling protrusions 552 are formed on one side of the grid base portion 551 facing the cover part 530. In the illustrated embodiment, the coupling protrusions are formed on the front and rear sides of the grid base portion 551.

The grid coupling protrusions 552 fix the arc grid 550 to the cover part 530.

The grid coupling protrusions 552 are inserted into the cover through holes 532 of the cover part 530.

The grid coupling protrusions 552 extend toward the cover part 530 from the one side of the grid base portion 551 that faces the cover part 530. In the illustrated embodiment, the grid coupling protrusions 552 extend from the front or rear side of the grid base portion 551 toward the front or rear side.

In one embodiment, the grid coupling protrusions 552 may be integrally formed with the grid base portion 551.

The grid leg 553 defines an arc induction path.

The grid leg 553 extends toward the rotating shaft 40 from another side of the grid base portion 551, different from the one side of the grid base portion 541. Also, the grid leg 553 extends in the lengthwise direction. In the illustrated embodiment, the grid leg 553 extends downward from a lower side of the grid base portion 551.

The grid leg 553 may be formed in various shapes depending on the shapes of the movable terminal part 330, the puffer guide 60, and the like, and operating conditions of the load switch 1.

A distance between the neighboring grid legs 553, a length and shape of the grid leg 553, and the like may change depending on the operating conditions of the load switch 1. In one embodiment, the grid leg 553 may be formed by being cut according to the operating conditions of the load switch 1.

The arc grid 550 includes two grid legs 553. In the embodiment illustrated in FIGS. 16 to 19, the grid legs 553 are formed to be symmetrical with respect to the front and rear and left and right directions of the arc grid 550.

Figure 23:
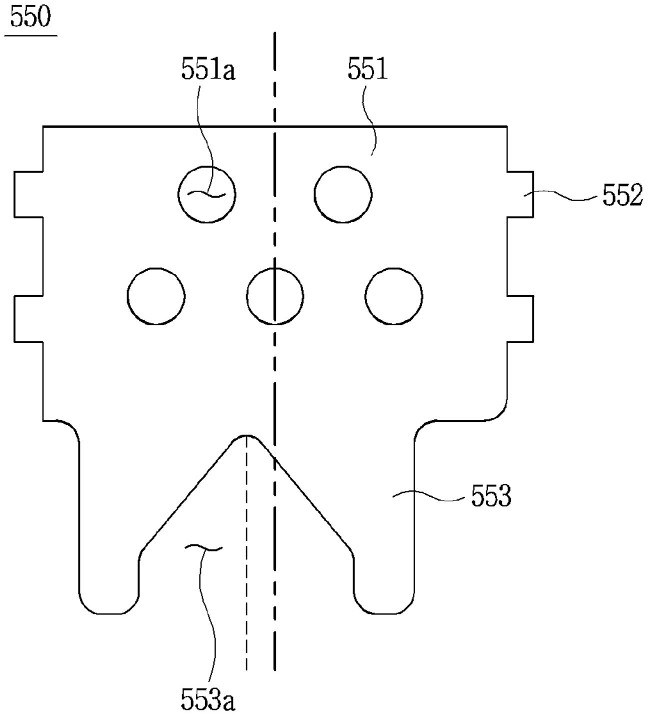
FIG. 23 is a lateral view illustrating the arc grid disposed in the arc chute of FIG. 20.
Figure 24:
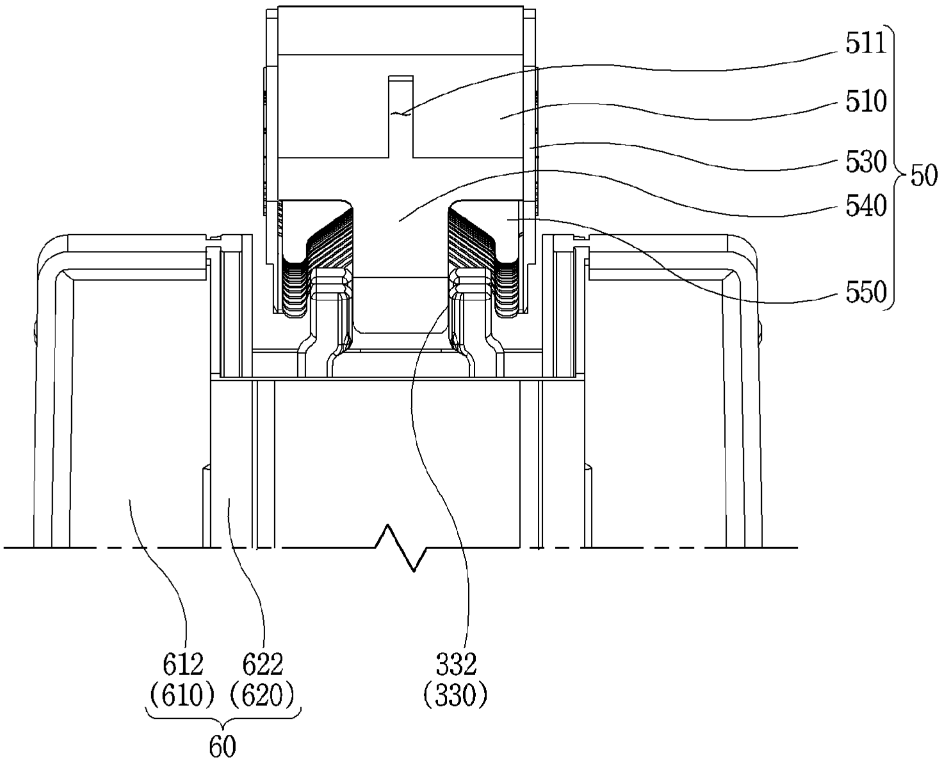
FIG. 24 is a lateral view illustrating an arc chute and a puffer guide in accordance with another embodiment of the present disclosure.
Figure 25:
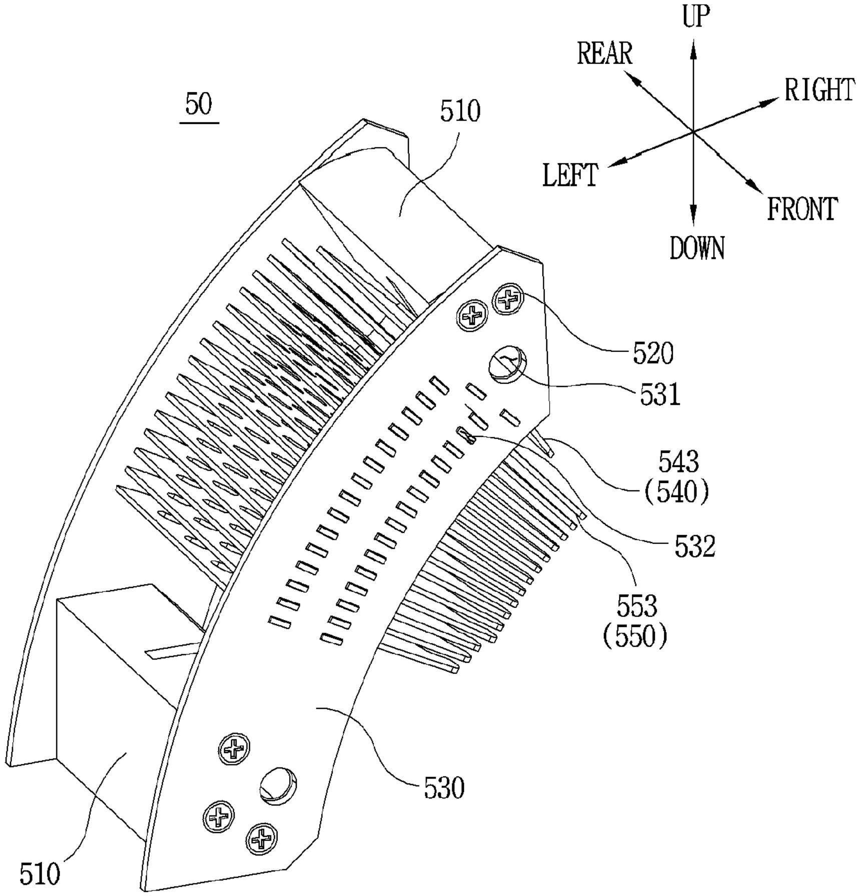
FIG. 25 is a perspective view illustrating the arc chute of FIG. 24.
Figure 26:
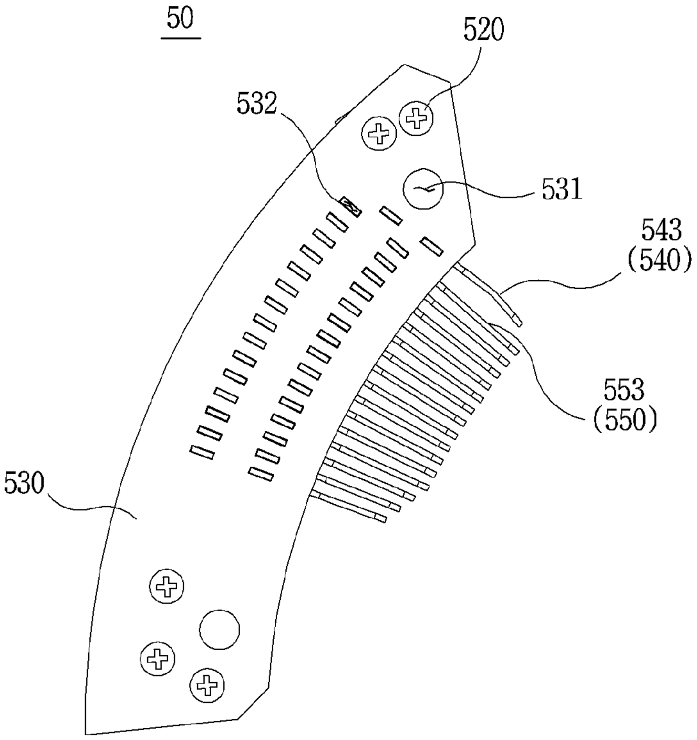
FIG. 26 is a front view illustrating the arc chute of FIG. 24.
Figure 27:
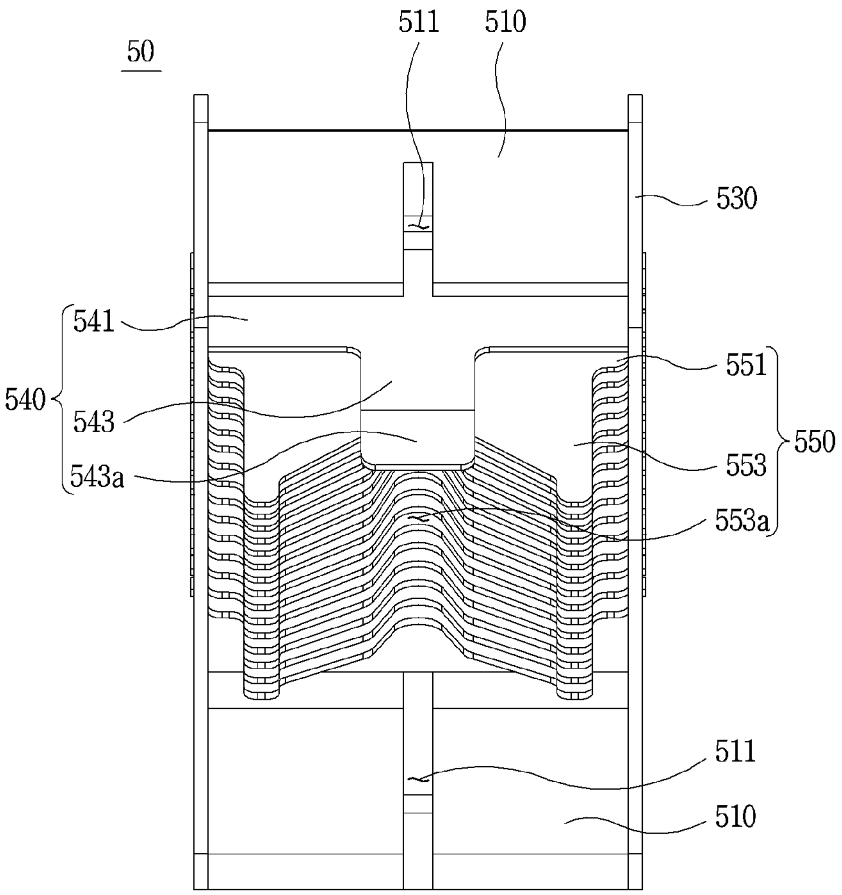
FIG. 27 is a lateral view illustrating the arc chute of FIG. 24.
Figure 28:
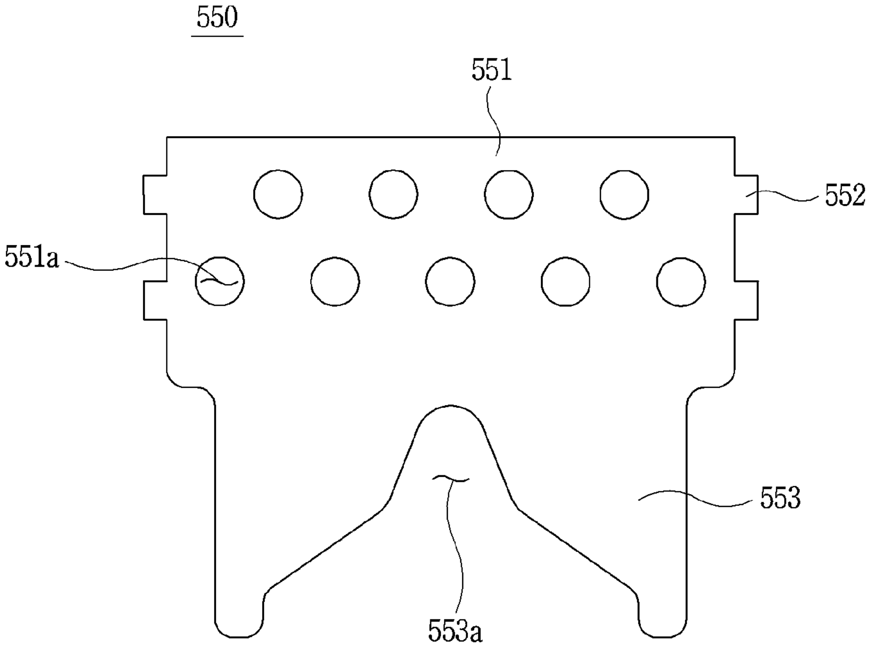
FIG. 28 is a lateral view illustrating the arc grid disposed in the arc chute of FIG. 24.

In the embodiment illustrated in FIG. 23, a center line (see a dotted line) of the two grid legs 553 disposed on the arc grid 550 is spaced apart from a center line (see a dash-double dotted line) of the arc grid 550. That is, the grid legs 553 are disposed to be biased in a specific direction with respect to the arc grid 550. In the above embodiment, the specific direction is either a front side or a rear side.

The grid legs 553 provided on the plurality of arc grids 550 are disposed so that the grid legs 553 provided on two adjacent arc grids 550 do not overlap each other in the circumferential direction of the frame part 10.

In the illustrated embodiment, the grid legs 553 provided on the two adjacent arc grids 550 are disposed so as not to overlap each other in the left and right directions.

One end portion, facing the rotating shaft 40, of each of the grid legs 553 disposed on the plurality of arc grids 550 is disposed along a predetermined curve. In one embodiment, a radius of curvature of the predetermined curve may be the same as that of the frame part 10. In another embodiment, the predetermined curve may be formed in a shape corresponding to the outer circumference of the frame part 10.

In the illustrated embodiment, the predetermined curve is bent in a specific direction. The specific direction is a radially outward direction of the rotating shaft 40. Accordingly, an insulation distance between the movable contact 332 and the arc grid 550 can be secured more reliably under the condition of the same number of arc grids 550. Furthermore, re-ignition of the arc can be prevented.

The one end portion of each of the grid legs 553 is disposed at a predetermined interval.

In one embodiment, the grid leg 553 may be integrally formed with the grid base portion 551 and the grid coupling protrusions 552.

A grid concave portion **553*a* is formed between the two grid legs 553 disposed on the arc grid 550. That is, the grid concave portion 553*a* refers to a space between the two grid legs 553**.

The grid concave portion **553*a*** defines a direct guide path of an arc.

An arc generated between the fixed terminal part 320 and the movable terminal part 330 is guided to the grid concave portion **553*a*** so as to be extinguished.

The grid concave portion **553*a* may be formed in various shapes. The shape of the grid concave portion 553*a* is determined according to the position and shape of the grid leg 553**.

In the embodiment illustrated in FIGS. 16 to 19, the grid concave portion **553*a* is formed to be symmetrical with respect to the front and rear and left and right directions of the arc grid 550**.

Figure 16:
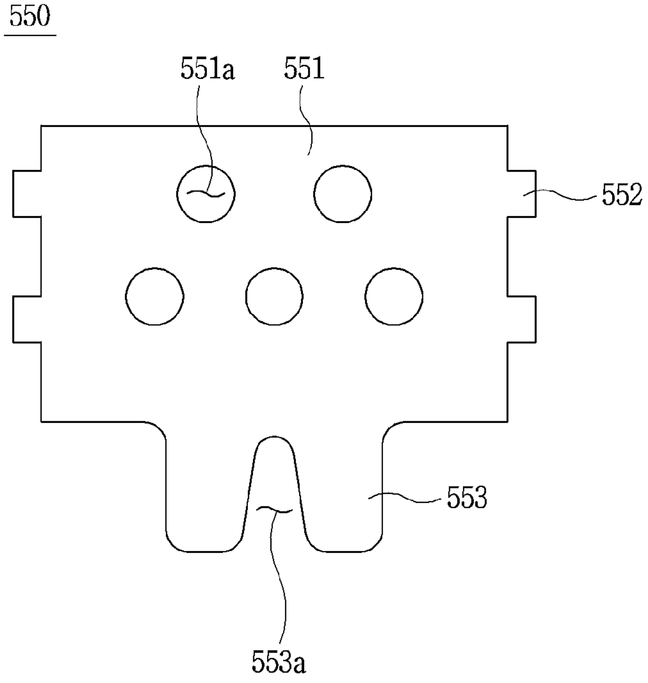
FIG. 16 is a lateral view illustrating the arc grid disposed in the arc chute of FIG. 8.

In the embodiment illustrated in FIG. 16, the grid concave portion **553*a* is formed such that a triangular cross-section with rounded corners extends in a thickness direction of the arc grid 550**.

Figure 17:
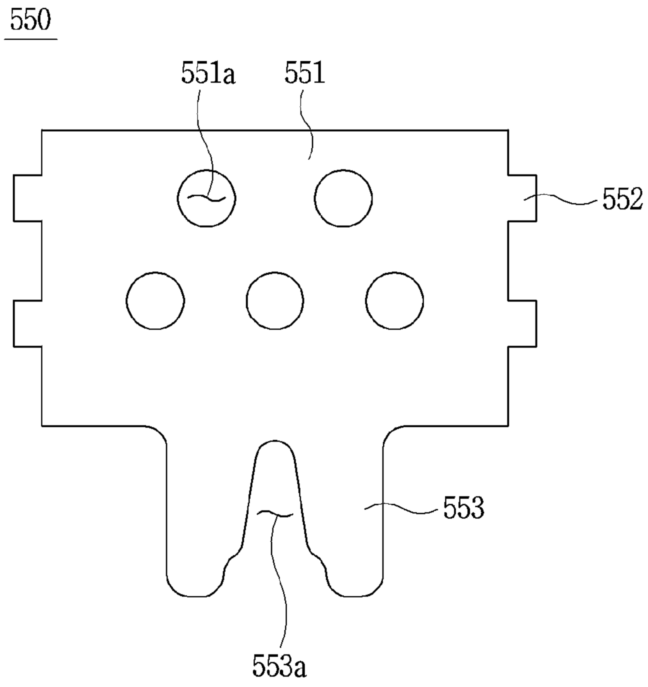
FIG. 17 is a lateral view illustrating an arc grid in accordance with another embodiment different from that of FIG. 16.

In the embodiment illustrated in FIG. 17, the grid concave portion **553*a* is formed such that a cross-section of a triangle having an expanded width on one side opposite to the grid base portion 551 extends in the thickness direction of the arc grid 550**.

Figure 18:
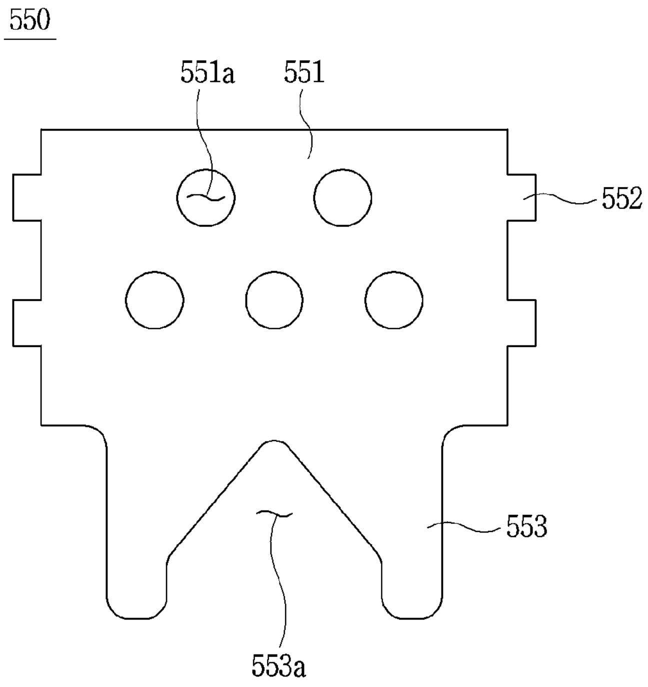
FIG. 18 is a lateral view illustrating an arc grid in accordance with still another embodiment different from that of FIG. 16.

In the embodiment illustrated in FIG. 18, the grid concave portion **553*a* is formed such that a pentagonal cross-section with rounded corners extends in the thickness direction of the arc grid 550**.

Figure 19:
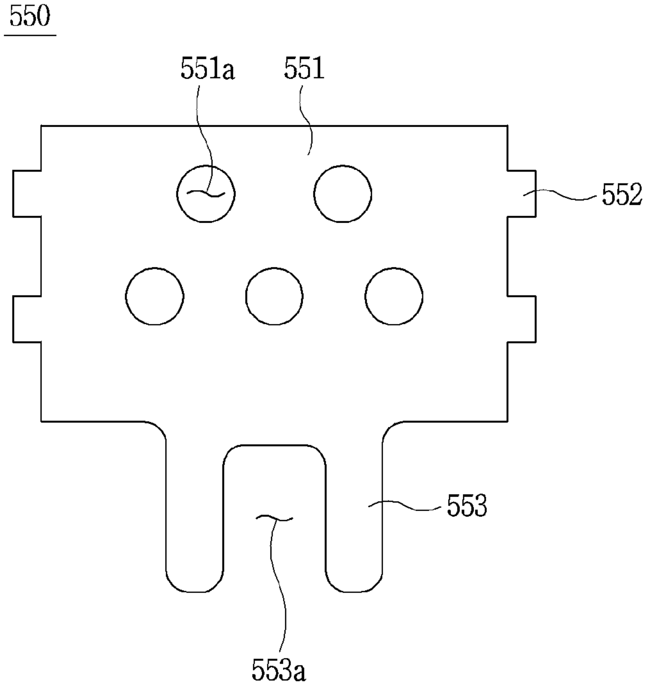
FIG. 19 is a lateral view illustrating an arc grid according to another embodiment different from that of FIG. 16.
Figure 20:
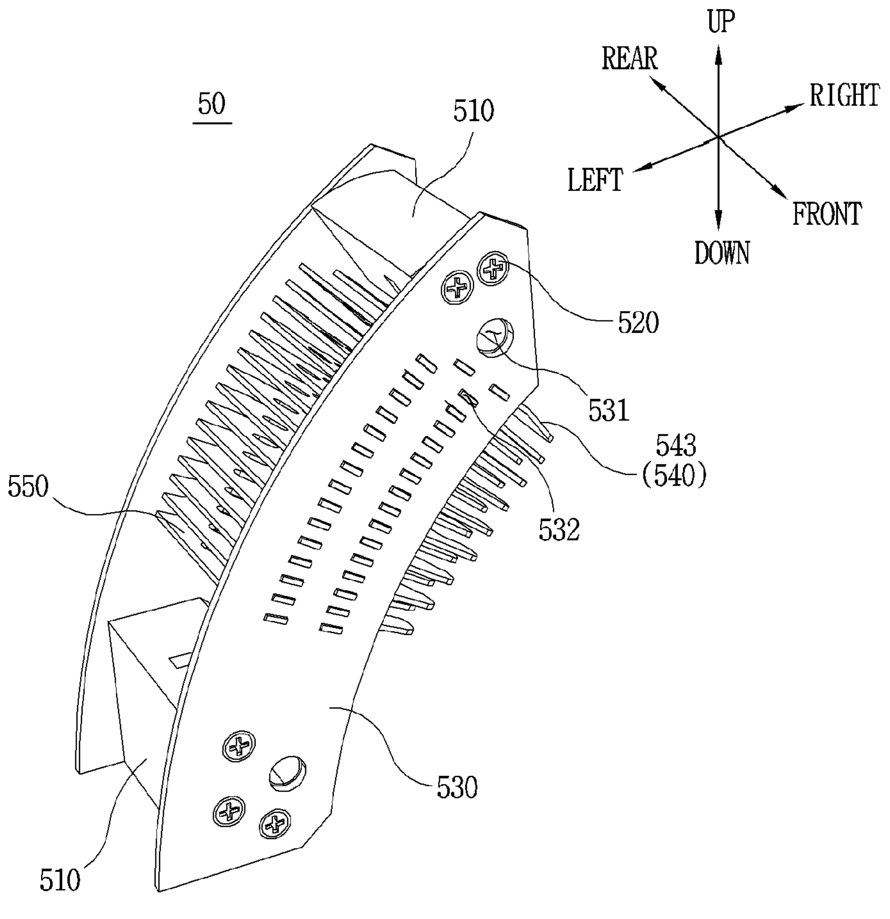
FIG. 20 is a perspective view illustrating an arc chute in accordance with another embodiment different from that of FIG. 8.
Figure 21:
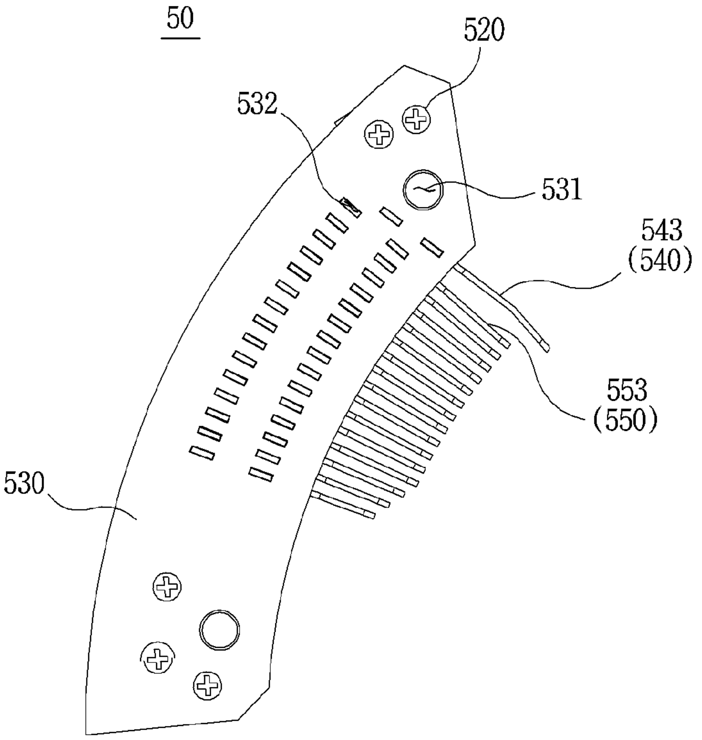
FIG. 21 is a front view illustrating the arc chute of FIG. 20.
Figure 22:
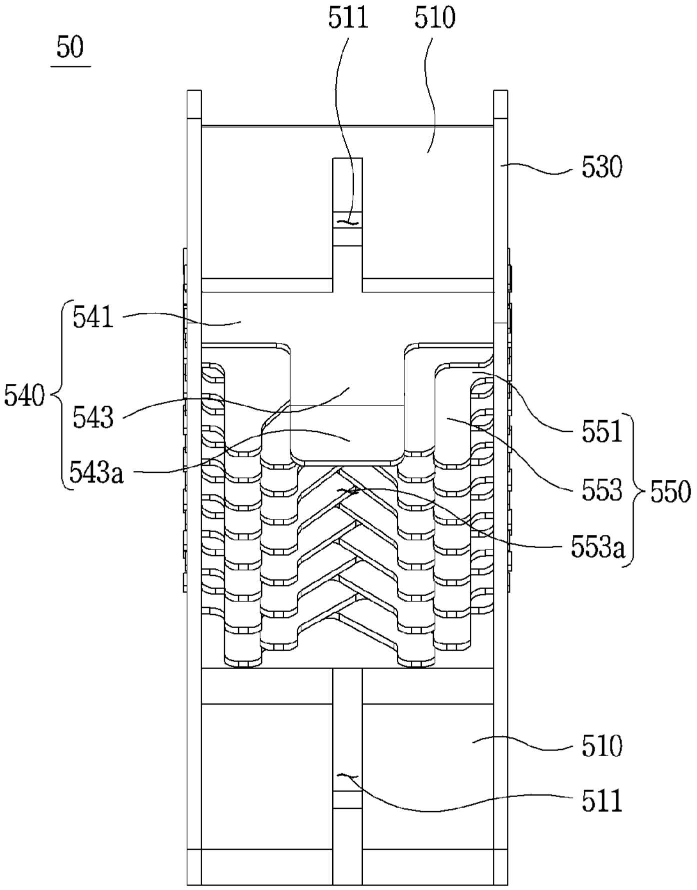
FIG. 22 is a lateral view illustrating the arc chute of FIG. 20.

In the embodiment illustrated in FIG. 19, the grid concave portion **553*a* is formed such that a rectangular cross-section with rounded corners extends in a thickness direction of the arc grid 550**.

In the embodiment illustrated in FIG. 23, a center line (see a dotted line) of the grid concave portion **553*a* is spaced apart from a center line (see a dash-double dotted line) of the arc grid 550. That is, the grid concave portion 553*a* is disposed to be biased in a specific direction with respect to the arc grid 550**. In the above embodiment, the specific direction is either a front side or a rear side.

In the embodiment, the grid concave portions **553*a* disposed on the plurality of arc grids 550 are disposed so that the grid concave portions 553*a* provided on two adjacent arc grids 550** do not overlap each other in the left and right directions.

The puffer guide 60 may be rotated in a direction toward the arc chute 50 or in a direction away from the arc chute 50.

The puffer guide 60 may narrow a flow path of gas of which pressure increases as the movable terminal part 330 rotates, thereby dispersing and extinguishing an arc.

The puffer guide 60 is accommodated in the inner space of the frame part 10.

The puffer guide 60 is coupled to one side of the rotating shaft 40. The puffer guide 60 extends radially outward of the rotating shaft 40 from the one side of the rotating shaft 40. In one embodiment, the puffer guide 60 may be coupled to the rotating shaft 40 in a welding manner.

The puffer guide 60 may be provided in plurality. In one embodiment, two puffer guides 60 may be provided. The two puffer guides 60 are disposed to face each other with the rotating shaft 40 interposed therebetween. That is, the two puffer guides 60 are disposed to be point-symmetrical with respect to the rotating shaft 40.

The puffer guide 60 is formed to enclose the movable terminal part 330. In the above embodiment, one side of the puffer guide 60 facing the radial outside of the rotating shaft 40 is open. Accordingly, an arc generated when the movable terminal part 330 rotates may be induced to the arc chute 50.

The puffer guide 60 coupled to the rotating shaft 40 is rotated together with the rotating shaft 40 when the rotating shaft 40 rotates. That is, the puffer guide 60 may be rotated clockwise or counterclockwise with respect to the rotating shaft 40. At this time, the puffer guide 60 does not collide with the arc grid 550.

During the rotation process, gas inside the arc chamber 310 is compressed and its pressure is increased. The gas passes through the puffer guide 60 and flows in a direction opposite to the rotation. During the flow process, the gas passes through the puffer guide 60 at high speed, and an arc extinguishing operation may be performed.

In the illustrated embodiment, the puffer guide 60 includes a housing portion 610 and an insertion portion 620.

The housing portion 610 defines appearance of the puffer guide 60.

The housing portion 610 supports the movable terminal part 330 in the front and rear and left and right directions.

The housing portion 610 is disposed adjacent to the rotating shaft 40. In addition, the housing portion 610 is directly coupled to the rotating shaft 40. In one embodiment, the housing portion 610 may be coupled to the rotating shaft 40 in a welding manner.

The housing portion 610 is formed in a column shape with a hollow inside. Both sides of the housing portion 610 facing the radial direction of the rotating shaft 40 are open.

In the illustrated embodiment, the housing portion 610 may be divided into a housing front portion, a housing rear portion 612, and a housing side portion based on the rotating direction.

The insertion portion 620 is coupled to one end of the housing portion 610 facing the radial outside of the rotating shaft 40.

The insertion portion 620 is coupled to the housing portion 610 in a sliding manner. The insertion portion 620 coupled to the housing portion 610 is prevented from being arbitrarily separated by a stopping jaw (not illustrated) formed on the housing portion 610.

The insertion portion 620 rotates together with the housing portion 610 when the rotating shaft 40 and the housing portion 610 rotate. During the rotation process, the insertion portion 620 does not collide with the arc grid 550. That is, the insertion portion 620 is disposed to be spaced apart from the arc grid 550.

In addition, a distance between one end of the insertion portion 620 facing the radial outside of the rotating shaft 40 and the rotating shaft 40 is shorter than a distance between one end of the arc grid 550 facing the radial inside of the rotating shaft 40 and the rotating shaft 40. That is, when compared to the arc grid 550, the insertion portion 620 is disposed more radially inward with respect to the frame part 10.

In the illustrated embodiment, the insertion portion 620 may be divided into an insertion front portion, an insertion rear portion 622, and an insertion side portion based on the rotating direction.

The insertion rear portion 622 is inserted into the housing rear portion 612.

The gas inside the frame part 10 is compressed when the rotating shaft 40 rotates and flows through the insertion rear portion 622 in a state in which its pressure is increased.

In one embodiment, the insertion rear portion 622 may be provided with a rear recess 622*a* in which the flow path of the gas is narrowed.

The rear recess 622*a* narrows the flow path of the gas inside the frame part 10 to disperse and extinguish an arc.

In addition, when the puffer guide 60 rotates, portions of the runner leg 543 and the grid leg 553 pass through the rear recess 622*a*.

The rear recess 622*a* is formed by being recessed in a direction toward the rotating shaft 40 from one side facing the radial outside of the rotating shaft 40.

The rear recess 622*a* is formed such that a predetermined cross-section thereof extends in the thickness direction of the insertion portion 620. In one embodiment, the predetermined cross-section is trapezoidal.

3. Description of Arc Chute 50 and Puffer Guide 60 According to Another Embodiment of the Present Disclosure Referring back to FIGS. 1 to 4, the load switch 1 according to the embodiment includes the arc chute 50 and the puffer guide 60.

The functions and structures of the arc chute 50 and the puffer guide 60 according to this embodiment correspond to those of the arc chute 50 and the puffer guide 60 according to the previous embodiment. However, several components of the arc chute 50 and the puffer guide 60 according to this embodiment are different from those of the arc chute 50 and the puffer guide 60 according to the previous embodiment.

Specifically, the arc chute 50 according to this embodiment is different from the arc chute 50 according to the previous embodiment in that the grid leg 553 extends toward the rotating shaft 40 to accommodate the movable contact 332.

In addition, the puffer guide 60 according to this embodiment is different from the puffer guide 60 according to the previous embodiment in that the insertion portion 620 is partially cut so that the movable terminal part 330 is exposed to the outside of the puffer guide 60.

Hereinafter, a description will mainly be given, with reference to FIGS. 24 to 28, of the difference of the arc chute 50 and the puffer guide 60 according to the another embodiment from the arc chute 50 and the puffer guide 60 according to the previous embodiment.

The arc chute 50 according to this embodiment includes a fastening portion 510, a coupling member 520, a cover part 530, an arc runner 540, and an arc grid 550.

Among those components, the fastening portion 510, the coupling member 520, the cover part 530, and the arc runner 540 are the same in structure, function, coupling structure, etc. as the fastening portion 510, the coupling member 520, and the cover part 530, and the arc runner 540 according to the previous embodiment.

The arc grid 550 according to this embodiment has substantially the same structure and function as the arc grid 550 according to the previous embodiment. However, the arc chute 550 according to this embodiment has a difference in that the grid leg 553 extends toward the rotating shaft 40 to accommodate the movable contact 332.

As described above, the grid leg 553 extends toward the rotating shaft 40 from one side of the grid base portion 551 facing the rotating shaft 40.

The arc grid 550 includes two grid legs 553. In the illustrated embodiment, the grid legs 553 are formed to be symmetrical with respect to the front and rear and left and right directions of the arc grid 550.

A distance between one end of the grid leg 553 facing the radial inside of the rotating shaft 40 and the rotating shaft 40 is shorter than a distance between the movable contact 332 and the rotating shaft 40. In other words, a distance between one end of the grid leg 553 facing the radial inside of the frame part 10 and the central axis of the frame part 10 is shorter than a distance between the movable contact 332 and the central axis of the frame part 10.

That is, the one end of the grid leg 553 is disposed more radially inward with respect to the frame part 10 when compared to the movable contact 332.

In an embodiment not illustrated, a center line of the two grid legs 553 disposed on the arc grid 550 may be spaced apart from the center line of the arc grid 550. That is, the grid legs 553 may be disposed to be biased in a specific direction with respect to the arc grid 550.

Also, the grid concave portion 553*a* is formed between the two grid legs 553 disposed on the arc grid 550.

The grid concave portion 553*a* has a width larger than a distance between the two movable contacts 332 facing each other. That is, the width of the grid concave portion 553*a* is larger than those of the two movable contacts 332.

The grid concave portion 553*a* may accommodate the movable contact 332. Specifically, when the movable terminal part 330 rotates, the movable contact 332 may rotate while passing through the inside of the grid concave portion 553*a*. Accordingly, an arc induction effect can be more increased.

The puffer guide 60 according to this embodiment has substantially the same structure and function as the puffer guide 60 according to the previous embodiment. However, the puffer guide 60 according to this embodiment has a difference in that one portion of the movable terminal part 330 is exposed to the outside.

The puffer guide 60 includes a housing portion 610 and an insertion portion 620. The housing portion 610 has the same structure, function, coupling structure, and the like as the housing portion 610 according to the previous embodiment. The insertion portion 620 has a difference in that the insertion rear portion 622 is cut so that the movable contact 332 is exposed to the outside of the insertion portion 620.

As described above, the insertion portion 620 rotates together with the housing portion 610 when the rotating shaft 40 and the housing portion 610 rotate.

In the illustrated embodiment, the insertion portion 620 may be divided into an insertion front portion, an insertion rear portion 622, and an insertion side portion based on the rotating direction.

In the illustrated embodiment, a separate rear recess 622*a* is not formed in the insertion rear portion 622. However, the insertion rear portion 622 is not limited to the illustrated shape and may be formed in various shapes. In an embodiment not illustrated, the rear recess 622*a* may be formed in the insertion rear portion 622.

A distance between one end of the insertion rear portion 622 facing the radial outside of the rotating shaft 40 and the rotating shaft 40 is shorter than a distance between the movable contact 332 and the rotating shaft 40. That is, when compared to the movable contact 332, the insertion rear portion 622 is disposed more radially inward with respect to the frame part 10. In other words, the movable contact 332 is exposed to the outside of the insertion portion 620.

Accordingly, when the movable terminal part 330 rotates, the movable contact 332 may pass through the grid concave portion 553*a* of the arc grid 550. This can maximize the arc induction effect.

4. Description of Process of Performing Arc Extinguishing Operation in Arc Chute 50 and Load Switch 1 Including Same According to Embodiment of the Present Disclosure Hereinafter, an arc extinguishing operation of the arc chute 50 and the load switch 1 including the arc chute 50 according to an embodiment of the present disclosure will be described with reference to FIG. 29. A rotating direction of each component will be understood with reference to FIG. 29.

Figure 29:
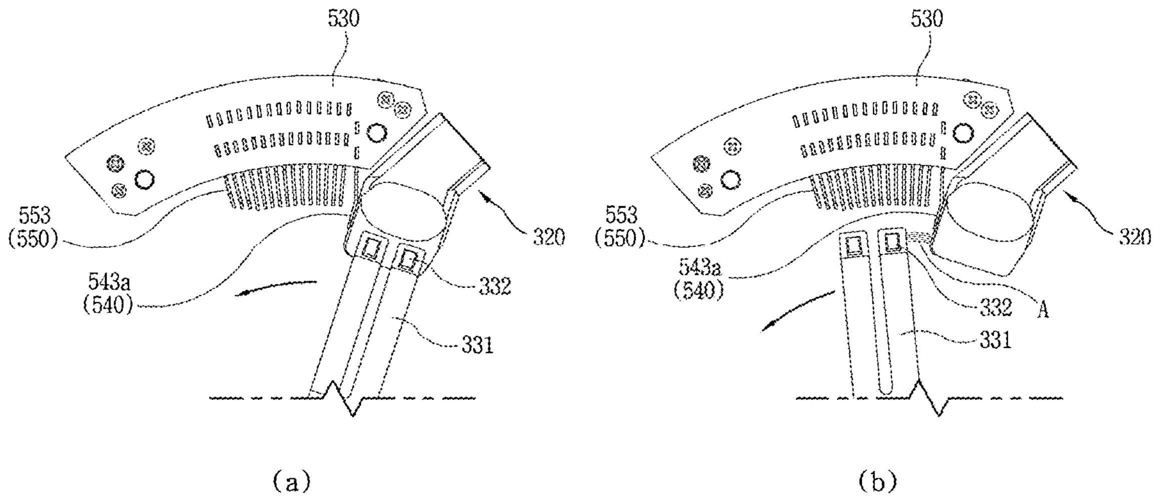
FIG. 29 is a conceptual view illustrating an opening and closing part and an arc chute in a state before arc generation (a) and a state after arc generation (b) according to an embodiment of the present disclosure.

(a) of FIG. 29 illustrates the load switch 1 in a state before an arc A is generated, and (b) of FIG. 29 illustrates the load switch 1 in a state after an arc A is generated.

When the movable contact 332 rotates in a direction away from the fixed contacts 321*b*, 322*b*, the movable contact 332 and the fixed contact 321*b*, 322*b* are separated from each other and an arc A is generated.

The generated arc A is primarily induced toward the arc runner 540. The arc A induced toward the arc runner 540 is moved from the arc runner 540 toward the arc grid 550. Specifically, the arc A is moved toward the grid concave portion 553*a* of the arc grid 550.

The arc A moves in a direction away from the fixed terminal part 320 along the grid concave portions 553*a* disposed in the plurality of grids. To increase the elongation and cooling effect of the arc A, the arc grid 550 may be provided with a plurality of arc holes 551*a*.

As described above, one end, facing the rotating shaft 40, of each of the grid legs 553 disposed on the plurality of grids 550 is disposed along a predetermined curve. In one embodiment, the predetermined curve is bent radially outward of the rotating shaft 40.

Accordingly, a movement path of the arc A is also bent radially outward of the rotating shaft 40. Therefore, an insulation distance between the movable contact 332 and the arc grid 550 can be increased, and re-ignition of the arc A can be suppressed.

As the series of processes proceed, the arc A may be elongated, cooled, and extinguished.

Although the above has been described with reference to preferred embodiments of the present disclosure, the present disclosure is not limited to the configuration of the above-described embodiments.

In addition, the present disclosure can be variously modified and changed by those skilled in the art to which the present disclosure pertains without departing from the spirit and scope of the present disclosure described in the claims below.

Furthermore, the above embodiments may be configured by selectively combining all or part of each embodiment so that various modifications can be made.

The invention claimed is:

1. An arc chute comprising:

two cover parts spaced apart from each other, overlapping each other in one direction, and each having at least one side formed in a curved shape; and an arc grid disposed between the two cover parts facing each other and coupled to each of the two cover parts, and wherein the arc grid is provided in plurality, wherein the arc grid comprises:

a grid base portion formed in a plate shape extending in a direction toward the cover parts; and wherein the arc chute further comprises:

two grid legs extending from one side of the grid base portion, and a fixed terminal part disposed adjacent to the cover parts;

a frame part formed in a column shape and accommodating a portion of the fixed terminal part; and a movable contact accommodated inside the frame part to be rotatable centering on a central axis of the frame part, wherein the grid legs extend to a radial inside of the frame part, and are formed such that a distance between one end thereof facing the radial inside of the frame part and the central axis of the frame part is shorter than a distance between the movable contact and the central axis of the frame part, a grid concave portion is formed in a space between the two grid legs, and a width of the grid concave portion is larger than a width of the movable contact.

2. The arc chute of claim 1, wherein the plurality of arc grids are disposed along the one side of the cover part.

3. The arc chute of claim 2, wherein the plurality of arc grids are disposed while maintaining a predetermined distance from a specific point.

4. The arc chute of claim 1, further comprising:

a fixed terminal part disposed adjacent to the cover parts and spaced apart from the arc grid; and an arc runner disposed between the two cover parts facing each other, coupled to each of the two cover parts, disposed between the fixed terminal part and the arc grid, and having one portion in contact with the fixed terminal part, wherein the plurality of arc grids are disposed so that lengths thereof are gradually decreased in a direction away from the fixed terminal part.

5. The arc chute of claim 4, wherein the arc runner extends in a direction toward the fixed terminal part, and has one end portion, facing the fixed terminal part, bent in an opposite direction to the fixed terminal part, and the one portion in contact with the fixed terminal part is located at the one side based on a bending line of the one end portion.

6. The arc chute of claim 1, wherein the movable contact rotates while passing through the grid concave portion when rotating in a direction away from or toward the fixed terminal part.

7. The arc chute of claim 6, further comprising:

a movable contact holder formed in a bar shape extending in a radial direction of the frame part and having the movable contact on one end portion thereof; and a puffer guide formed in a column shape extending in the radial direction of the frame part, having a hollow formed therein to accommodate the movable contact holder, and having the movable contact disposed on an outside thereof.

8. The arc chute of claim 1, wherein a center line of the two grid legs is spaced apart from a center line of the arc grid to be biased with respect to the arc grid.

9. The arc chute of claim 8, wherein the arc grid is provided in plurality, the plurality of arc grids are disposed in a predetermined direction, and the grid legs disposed on two of the arc grids adjacent to each other are disposed so as not to overlap each other in the predetermined direction.

10. The arc chute of claim 1, wherein the arc grid is provided with an arc hole formed therethrough in a thickness direction.

11. The arc chute of claim 10, wherein the arc hole of the arc grid is provided in plurality.

12. A load switch comprising:

an opening and closing part including a fixed terminal part and a movable terminal part;

a frame part accommodating a portion of the fixed terminal part;

a rotating shaft rotatably coupled to the frame part, and connected to the movable terminal part to rotate together with the movable terminal part; and an arc chute disposed adjacent to the fixed terminal part, wherein the arc chute comprises:

two cover parts spaced apart from each other, overlapping each other in one direction, and each having at least one side formed in a curved shape; and an arc grid disposed between the two cover parts facing each other, coupled to each of the two cover parts, and spaced apart from the fixed terminal part, and wherein the arc grid is provided in plurality, and wherein the movable terminal part includes a movable contact accommodated inside the frame part to be rotatable centering on a central axis of the rotating shaft, the arc grid comprising:

a grid base portion formed in a plate shape extending in a direction toward the cover parts; and two grid legs extending from one side of the grid base portion to a radial inside of the frame part, the grid legs are formed such that a distance between one end facing the radial inside of the frame part and the rotating shaft is shorter than a distance between the movable contact and the rotating shaft, a grid concave portion is formed in a space between the two grid legs, and the grid concave portion has a width larger than that of the movable contact, such that the movable contact rotates while passing therethrough.

13. The load switch of claim 12, wherein the plurality of arc grids are disposed along the one side of the cover part.

14. The load switch of claim 13, wherein the plurality of arc grids are disposed while maintaining a predetermined distance from a specific point.

15. The load switch of claim 12, wherein the plurality of arc grids are disposed so that length thereof are gradually decreased in a direction away from the fixed terminal part.

16. The load switch of claim 12, wherein the arc chute comprises an arc runner disposed between the two cover parts facing each other, coupled to each of the two cover parts, disposed between the fixed terminal part and the arc grid, and having one portion in contact with the fixed terminal part.

17. The load switch of claim 16, wherein the arc runner extends in a direction toward the fixed terminal part, and has one end portion, facing the fixed terminal part, bent in an opposite direction to the fixed terminal part, and the one portion in contact with the fixed terminal part is located at a radial inside of the frame part based on a bending line of the one end portion.

18. The load switch of claim 12, further comprising:

a movable contact holder formed in a bar shape extending in a radial direction of the frame part and having the movable contact on one end portion thereof; and a puffer guide formed in a column shape extending in the radial direction of the frame part, having a hollow formed therein to accommodate the movable contact holder, and having the movable contact disposed on an outside thereof.

19. The load switch of claim 12, wherein the arc grid comprises:

two grid legs extending from one side of the grid base portion to a radial inside of the frame part, and the grid legs disposed on two adjacent arc grids are disposed so as not to overlap each other in a circumferential direction of the frame part.

* * * * *